(12) United States Patent
Jernigan

(10) Patent No.: US 7,655,746 B2
(45) Date of Patent: *Feb. 2, 2010

(54) PHOSPHORUS CONTAINING COMPOUNDS FOR REDUCING ACETALDEHYDE IN POLYESTERS POLYMERS

(75) Inventor: Mary Therese Jernigan, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/229,367

(22) Filed: Sep. 16, 2005

(65) Prior Publication Data

US 2007/0066794 A1    Mar. 22, 2007

(51) Int. Cl.
*C08G 64/00* (2006.01)
*C08G 63/02* (2006.01)

(52) U.S. Cl. .......... 528/272; 206/96; 206/139; 502/150; 502/208; 528/271; 528/280; 528/281; 528/282; 528/284

(58) Field of Classification Search .......... 528/279, 528/286, 287, 288, 289, 292, 302, 308, 308.1, 528/308.6, 271, 272, 280, 281, 282, 284; 428/35.7; 524/706, 707, 710, 713, 714, 722; 206/96, 139; 502/150, 208
See application file for complete search history.

(56) References Cited

U.S. PATENT DOCUMENTS

| 2,720,506 | A | 10/1955 | Caldwell et al. |
|---|---|---|---|
| 2,808,390 | A | 10/1957 | Caldwell et al. |
| 2,965,613 | A | 12/1960 | Milone et al. |
| 2,991,273 | A | 7/1961 | Hechelhammer et al. |
| 2,999,835 | A | 9/1961 | Goldberg |
| 2,999,846 | A | 9/1961 | Schnell et al. |
| 3,028,365 | A | 4/1962 | Schnell et al. |
| 3,148,172 | A | 9/1964 | Fox |
| 3,153,008 | A | 10/1964 | Fox |
| 3,264,255 | A | 8/1966 | Taylor |
| 3,271,367 | A | 9/1966 | Schnell et al. |
| 3,420,913 | A | 1/1969 | Railsback |
| 3,451,971 | A | 6/1969 | Lazarus |
| 3,533,973 | A | 10/1970 | Stewart et al. |
| 3,538,045 | A | 11/1970 | Stewart et al. |
| 3,624,040 | A | 11/1971 | Rath et al. |
| 3,631,153 | A | 12/1971 | Carter et al. |
| 3,660,328 | A | 5/1972 | Lindquist, Jr. |
| 3,693,960 | A | 9/1972 | Golde et al. |
| 3,733,309 | A | 5/1973 | Wyeth et al. |
| 3,794,592 | A | 2/1974 | Winters et al. |
| 3,795,601 | A | 3/1974 | Brewer et al. |
| 3,796,691 | A | 3/1974 | Chimura et al. |
| 3,867,315 | A | 2/1975 | Tignier et al. |
| 3,867,349 | A | 2/1975 | Heeg et al. |
| 3,869,304 | A | 3/1975 | Bogulslawski et al. |
| 3,880,582 | A | 4/1975 | Sawaya |
| 3,892,798 | A | 7/1975 | Heeg et al. |
| 3,907,754 | A | 9/1975 | Tershansy et al. |
| 3,951,905 | A | 4/1976 | Sano et al. |
| 3,962,189 | A | 6/1976 | Russin et al. |
| 4,010,145 | A | 3/1977 | Russin et al. |
| 4,025,492 | A | 5/1977 | Binsack et al. |
| 4,087,482 | A | 5/1978 | Shaffer |
| 4,093,593 | A | 6/1978 | Go |
| 4,097,445 | A | 6/1978 | Martins et al. |
| 4,100,142 | A | 7/1978 | Schaefer et al. |
| 4,107,149 | A | 8/1978 | Bier et al. |
| 4,123,436 | A | 10/1978 | Holub et al. |
| 4,124,566 | A | 11/1978 | Saiki et al. |
| 4,136,089 | A | 1/1979 | Bier et al. |
| 4,150,215 | A | 4/1979 | Kelley |
| 4,159,301 | A | 6/1979 | Buser et al. |
| 4,161,571 | A | 7/1979 | Yasui et al. |
| 4,169,006 | A | 9/1979 | Matsubara et al. |
| 4,176,224 | A | 11/1979 | Bier et al. |
| 4,185,043 | A | 1/1980 | Shaffer |
| 4,208,527 | A | 6/1980 | Horlbeck et al. |
| 4,228,549 | A | 10/1980 | Rispoli |
| 4,230,595 | A | 10/1980 | Yamaji et al. |
| 4,238,593 | A | 12/1980 | Duh |
| 4,250,078 | A | 2/1981 | McFarlane et al. |

(Continued)

FOREIGN PATENT DOCUMENTS

AT    259232    1/1968

(Continued)

OTHER PUBLICATIONS

Plastic Additives Handbook 5th Ed., 2001, pp. 123-136, Hanser Gardner Publications.

(Continued)

*Primary Examiner*—Terressa M Boykin
(74) *Attorney, Agent, or Firm*—Michael K. Carrier; Bernard J. Graves, Jr.

(57) ABSTRACT

Polyesters whose polycondensation is catalyzed by titanium-containing catalysts and which are susceptible to acetaldehyde formation during polycondensation or subsequent molding operations are prepared with low finished acetaldehyde content and reduced acetaldehyde generation by adding an ammonium or amine salt of an oxyphosphorus-acid. Polyesters, especially polyethylene terephthalate, may be produced with high inherent viscosity in reduced processing time, without the necessity of further polymerization in the solid state.

41 Claims, 2 Drawing Sheets

U.S. PATENT DOCUMENTS

| | | | |
|---|---|---|---|
| 4,260,735 A | 4/1981 | Bander et al. | |
| 4,289,871 A | 9/1981 | Rowan et al. | |
| 4,321,298 A | 3/1982 | Shaffer et al. | |
| 4,330,661 A | 5/1982 | Go | |
| 4,343,922 A | 8/1982 | Shaffer | |
| 4,356,299 A | 10/1982 | Cholod et al. | |
| 4,357,461 A | 11/1982 | Go et al. | |
| 4,359,570 A | 11/1982 | Davis et al. | |
| 4,359,580 A | 11/1982 | Grasso | |
| 4,401,804 A | 8/1983 | Wooten et al. | |
| 4,408,004 A | 10/1983 | Pengilly | |
| 4,420,581 A | 12/1983 | McFarlane et al. | |
| 4,424,337 A | 1/1984 | Smith et al. | |
| 4,433,135 A | 2/1984 | Worley et al. | |
| 4,434,276 A | 2/1984 | Horlbeck et al. | |
| 4,440,924 A | 4/1984 | Kuze et al. | |
| 4,447,595 A | 5/1984 | Smith et al. | |
| 4,476,272 A | 10/1984 | Pengilly | |
| 4,481,314 A | 11/1984 | Rule | |
| 4,501,878 A | 2/1985 | Adams | |
| 4,520,078 A | 5/1985 | Rabinowitz et al. | |
| 4,532,290 A | 7/1985 | Jaquiss et al. | |
| 4,535,118 A | 8/1985 | Pengilly | |
| 4,545,926 A | 10/1985 | Fouts et al. | |
| 4,551,368 A | 11/1985 | Smith et al. | |
| 4,604,303 A | 8/1986 | Takakura et al. | |
| 4,609,721 A | 9/1986 | Kirshenbaum et al. | |
| 4,613,664 A | 9/1986 | Tate et al. | |
| 4,617,373 A | 10/1986 | Pruett et al. | |
| 4,617,374 A | 10/1986 | Pruett et al. | |
| 4,619,987 A | 10/1986 | Saiki et al. | |
| 4,647,650 A | 3/1987 | Sasaki et al. | |
| 4,654,399 A | 3/1987 | Callander et al. | |
| 4,686,274 A | 8/1987 | Harris et al. | |
| 4,702,963 A | 10/1987 | Phillips et al. | |
| 4,702,980 A | 10/1987 | Matsuura et al. | |
| 4,704,417 A | 11/1987 | Bonin et al. | |
| 4,705,844 A | 11/1987 | Espenchied et al. | |
| 4,740,377 A | 4/1988 | Dawes et al. | |
| 4,745,173 A | 5/1988 | Weaver et al. | |
| 4,745,174 A | 5/1988 | Pruett et al. | |
| 4,764,323 A | 8/1988 | Al Ghatta | |
| 4,775,598 A | 10/1988 | Jaeckel | |
| 4,790,581 A | 12/1988 | Boswell et al. | |
| 4,806,696 A | 2/1989 | Job | |
| 4,831,115 A | 5/1989 | Golba, Jr. et al. | |
| 4,845,186 A | 7/1989 | Chujo et al. | |
| 4,851,497 A | 7/1989 | Wakui et al. | |
| 4,876,230 A | 10/1989 | Job | |
| 4,906,693 A | 3/1990 | Craun et al. | |
| 4,982,014 A | 1/1991 | Freitag et al. | |
| 4,999,418 A | 3/1991 | Krutak et al. | |
| 5,008,230 A | 4/1991 | Nichols | |
| 5,010,162 A | 4/1991 | Serini et al. | |
| 5,041,405 A | 8/1991 | Lunsford et al. | |
| 5,049,647 A | 9/1991 | Al-Ghatta | |
| 5,090,134 A | 2/1992 | Russemeyer et al. | |
| 5,104,965 A | 4/1992 | Jenkins et al. | |
| 5,106,942 A | 4/1992 | Krutak et al. | |
| 5,114,570 A | 5/1992 | Nelson et al. | |
| 5,124,301 A | 6/1992 | Wyness et al. | |
| 5,189,077 A | 2/1993 | Kerby | |
| 5,220,140 A | 6/1993 | Ball et al. | |
| 5,235,027 A | 8/1993 | Thiele et al. | |
| 5,250,333 A | 10/1993 | McNeely et al. | |
| 5,252,699 A | 10/1993 | Chamberlin et al. | |
| 5,254,288 A | 10/1993 | Verheijen et al. | |
| 5,254,625 A | 10/1993 | Weaver et al. | |
| 5,258,233 A | 11/1993 | Mills et al. | |
| 5,266,413 A | 11/1993 | Mills et al. | |
| 5,296,587 A | 3/1994 | Sumner, Jr. et al. | |
| 5,300,746 A | 4/1994 | Walters et al. | |
| 5,310,977 A | 5/1994 | Stenkamp et al. | |
| 5,322,883 A | 6/1994 | Adyha et al. | |
| 5,331,066 A | 7/1994 | Takanoo et al. | |
| 5,340,884 A | 8/1994 | Mills et al. | |
| 5,340,910 A | 8/1994 | Chamberlin et al. | |
| 5,367,070 A | 11/1994 | Nath et al. | |
| 5,372,864 A | 12/1994 | Weaver et al. | |
| 5,382,157 A | 1/1995 | Denis et al. | |
| 5,384,377 A | 1/1995 | Weaver et al. | |
| 5,393,871 A | 2/1995 | Yau et al. | |
| 5,403,807 A | 4/1995 | Narula | |
| 5,409,983 A | 4/1995 | Jones et al. | |
| 5,410,984 A | 5/1995 | Pikus et al. | |
| 5,419,936 A | 5/1995 | Tindale | |
| 5,466,803 A * | 11/1995 | Borzatta et al. | 544/198 |
| 5,496,887 A | 3/1996 | Braune | |
| 5,514,462 A | 5/1996 | Endo et al. | |
| 5,519,112 A | 5/1996 | Harazoe et al. | |
| 5,529,744 A | 6/1996 | Tindale | |
| 5,532,332 A | 7/1996 | Weaver et al. | |
| 5,541,244 A | 7/1996 | van der Meer et al. | |
| 5,552,463 A | 9/1996 | Akkapeddi et al. | |
| 5,573,820 A * | 11/1996 | Harazoe et al. | 428/35.7 |
| 5,589,530 A | 12/1996 | Walsh | |
| 5,593,740 A | 1/1997 | Strumban et al. | |
| 5,608,027 A | 3/1997 | Crosby et al. | |
| 5,610,231 A | 3/1997 | Braune | |
| 5,646,208 A | 7/1997 | Cattron et al. | |
| 5,648,032 A | 7/1997 | Nelson et al. | |
| 5,650,481 A | 7/1997 | Yau et al. | |
| 5,656,221 A | 8/1997 | Schumann et al. | |
| 5,656,716 A | 8/1997 | Schmidt et al. | |
| 5,674,801 A | 10/1997 | George | |
| 5,688,874 A | 11/1997 | Hoffman | |
| 5,718,860 A | 2/1998 | Lee et al. | |
| 5,742,223 A | 4/1998 | Simendinger et al. | |
| 5,774,571 A | 6/1998 | Marshall | |
| 5,830,544 A | 11/1998 | Kerscher et al. | |
| 5,830,981 A | 11/1998 | Koreishe et al. | |
| 5,837,786 A | 11/1998 | Miyoshi et al. | |
| 5,851,668 A | 12/1998 | Sandor et al. | |
| 5,874,515 A | 2/1999 | Huang et al. | |
| 5,886,133 A | 3/1999 | Hilbert et al. | |
| 5,898,058 A * | 4/1999 | Nichols et al. | 528/286 |
| 5,906,882 A | 5/1999 | Valente et al. | |
| 5,925,710 A | 7/1999 | Wu et al. | |
| 5,940,022 A | 8/1999 | Takatsu | |
| 5,945,460 A | 8/1999 | Ekart et al. | |
| 5,962,608 A | 10/1999 | Ryang et al. | |
| 5,976,450 A | 11/1999 | Mreijen | |
| 5,984,997 A | 11/1999 | Bickmore et al. | |
| 5,998,004 A | 12/1999 | Nishino et al. | |
| 6,020,419 A | 2/2000 | Bock et al. | |
| 6,020,421 A | 2/2000 | Fukushima et al. | |
| 6,022,920 A | 2/2000 | Maxwell et al. | |
| 6,031,128 A | 2/2000 | Roh et al. | |
| 6,034,202 A | 3/2000 | Aharoni et al. | |
| 6,036,905 A | 3/2000 | Park et al. | |
| 6,042,773 A | 3/2000 | Teramoto et al. | |
| 6,048,957 A | 4/2000 | Ekart et al. | |
| 6,063,827 A | 5/2000 | Sacripante et al. | |
| 6,066,714 A | 5/2000 | Putzig et al. | |
| 6,099,778 A | 8/2000 | Nelson et al. | |
| 6,113,997 A | 9/2000 | Massey et al. | |
| 6,150,454 A | 11/2000 | Wu et al. | |
| 6,156,867 A | 12/2000 | Aoyama et al. | |
| 6,165,601 A | 12/2000 | Noda et al. | |
| 6,166,170 A | 12/2000 | Putzig | |
| 6,197,851 B1 | 3/2001 | Maxwell et al. | |
| 6,200,659 B1 | 3/2001 | Fujimori et al. | |
| 6,214,915 B1 | 4/2001 | Avakian et al. | |
| 6,261,656 B1 | 7/2001 | Semersky | |

| | | |
|---|---|---|
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,346,070 B1 * | 2/2002 | Ohmatsuzawa et al. ..... 528/279 |
| 6,358,578 B1 | 3/2002 | Otto et al. |
| 6,365,659 B1 | 4/2002 | Aoyama et al. |
| 6,384,180 B1 | 5/2002 | Jernigan et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,440,383 B1 | 8/2002 | Duyvesteyn et al. |
| 6,451,959 B1 | 9/2002 | Ohmatsuzawa et al. |
| 6,465,098 B2 | 10/2002 | Mizuguchi et al. |
| 6,472,471 B2 | 10/2002 | Cooke et al. |
| 6,472,500 B2 | 10/2002 | Dhawan et al. |
| 6,473,024 B2 | 10/2002 | Toyoda et al. |
| 6,489,434 B2 | 12/2002 | Jen |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,541,598 B2 | 4/2003 | Duan et al. |
| 6,559,271 B2 | 5/2003 | Schaaf et al. |
| 6,569,479 B2 | 5/2003 | Rule |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,044 B2 | 7/2003 | Suzuki et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,638,456 B2 | 10/2003 | Klein et al. |
| 6,649,731 B2 * | 11/2003 | Hori et al. ..... 528/279 |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,733,873 B2 | 5/2004 | Mizutani et al. |
| 6,773,800 B2 | 8/2004 | Hosoe et al. |
| 6,774,204 B1 | 8/2004 | Putzig |
| 6,777,048 B2 | 8/2004 | Quillen |
| 6,780,916 B2 | 8/2004 | Tung et al. |
| 6,787,630 B1 | 9/2004 | Dominguez De Walter et al. |
| 6,794,463 B2 | 9/2004 | Aramaki et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,852,388 B2 | 2/2005 | Murschall et al. |
| 6,887,947 B1 | 5/2005 | Schaefer et al. |
| 6,896,830 B2 | 5/2005 | Carlton et al. |
| 6,896,966 B2 | 5/2005 | Crawford et al. |
| 6,908,956 B2 * | 6/2005 | Sutoris et al. ..... 524/89 |
| 6,953,768 B2 | 10/2005 | Wallace et al. |
| 7,129,317 B2 | 10/2006 | Moore et al. |
| 7,138,478 B2 | 11/2006 | Kohlgrüber et al. |
| 7,300,967 B2 | 11/2007 | Xia |
| 7,303,795 B2 | 12/2007 | Neal et al. |
| 7,368,523 B2 | 5/2008 | Xia et al. |
| 7,439,294 B2 | 10/2008 | Xia |
| 2002/0011694 A1 | 1/2002 | Nichols et al. |
| 2002/0032300 A1 | 3/2002 | Dowling et al. |
| 2002/0077443 A1 | 6/2002 | Nichols et al. |
| 2002/0087027 A1 | 7/2002 | Lindall et al. |
| 2002/0091226 A1 | 7/2002 | Nichols et al. |
| 2002/0094402 A1 | 7/2002 | Jen |
| 2002/0128427 A1 | 9/2002 | Schaaf et al. |
| 2002/0136808 A1 | 9/2002 | Rule |
| 2002/0137872 A1 | 9/2002 | Schneider et al. |
| 2002/0137879 A1 | 9/2002 | Ohmatsuzawa et al. |
| 2002/0193555 A1 | 12/2002 | Hori et al. |
| 2002/0198297 A1 | 12/2002 | Odorisio et al. |
| 2003/0017336 A1 | 1/2003 | Gedanken et al. |
| 2003/0018160 A1 | 1/2003 | Otto et al. |
| 2003/0040564 A1 | 2/2003 | Tung et al. |
| 2003/0045673 A1 | 3/2003 | Nakajima et al. |
| 2003/0083191 A1 | 5/2003 | Nakajima et al. |
| 2003/0108702 A1 | 6/2003 | Tung et al. |
| 2003/0144459 A1 | 7/2003 | Fujimori et al. |
| 2003/0216253 A1 | 11/2003 | Wiegner et al. |
| 2004/0023000 A1 | 2/2004 | Young et al. |
| 2004/0030029 A1 | 2/2004 | Weinhold et al. |
| 2004/0058805 A1 | 3/2004 | Nakajima et al. |
| 2004/0077486 A1 | 4/2004 | Bellamy et al. |
| 2004/0086733 A1 | 5/2004 | Fujimori et al. |
| 2004/0096609 A1 | 5/2004 | Nichols et al. |
| 2004/0101642 A1 | 5/2004 | Quillen et al. |
| 2004/0102316 A1 | 5/2004 | Wallace et al. |
| 2004/0106767 A1 | 6/2004 | Simon et al. |
| 2004/0122150 A1 | 6/2004 | Quillen et al. |
| 2004/0127653 A1 | 7/2004 | Ellington et al. |
| 2004/0138057 A1 | 7/2004 | Wenzel |
| 2004/0178386 A1 | 9/2004 | Tung et al. |
| 2004/0180159 A1 | 9/2004 | Neal et al. |
| 2004/0180996 A1 | 9/2004 | Pearson et al. |
| 2004/0180997 A1 | 9/2004 | Pearson et al. |
| 2004/0185198 A1 | 9/2004 | Sisson et al. |
| 2004/0192813 A1 | 9/2004 | Pearson et al. |
| 2004/0224842 A1 | 11/2004 | Wallace et al. |
| 2004/0225104 A1 | 11/2004 | Wiegner et al. |
| 2004/0236066 A1 | 11/2004 | Moore et al. |
| 2004/0249113 A1 | 12/2004 | Quillen et al. |
| 2005/0009941 A1 * | 1/2005 | Sicken et al. ..... 521/132 |
| 2005/0058846 A1 | 3/2005 | Matsui et al. |
| 2005/0107576 A1 | 5/2005 | Hori et al. |
| 2005/0153086 A1 | 7/2005 | Moore et al. |
| 2005/0165148 A1 | 7/2005 | Bogerd et al. |
| 2005/0180284 A1 | 8/2005 | Hay et al. |
| 2005/0203267 A1 | 9/2005 | Jernigan et al. |
| 2005/0222345 A1 | 10/2005 | Nakayama et al. |
| 2005/0239929 A1 | 10/2005 | Sakamoto et al. |
| 2006/0033078 A1 | 2/2006 | Rollick |
| 2006/0047103 A1 | 3/2006 | Armentrout et al. |
| 2006/0205855 A1 | 9/2006 | Xia |
| 2006/0223958 A1 | 10/2006 | Fischbuch |
| 2007/0059465 A1 | 3/2007 | Thompson et al. |
| 2007/0066735 A1 * | 3/2007 | Quillen et al. ..... 524/404 |
| 2007/0066792 A1 | 3/2007 | Colhoun et al. |
| 2007/0106055 A1 | 5/2007 | Kageyama et al. |
| 2007/0203279 A1 | 8/2007 | Jarvis et al. |
| 2007/0260002 A1 | 11/2007 | Xia et al. |
| 2008/0058495 A1 | 3/2008 | Quillen et al. |

FOREIGN PATENT DOCUMENTS

| | | |
|---|---|---|
| CN | 1312218 | 9/2001 |
| CN | 1392174 | 1/2003 |
| CN | 1482154 | 3/2004 |
| DE | 1950553 | 4/1970 |
| DE | 32 48 840 A1 | 9/1983 |
| DE | 1 95 37 930 | 4/1997 |
| DE | 19841376 | 3/2000 |
| EP | 0578464 | 1/1994 |
| EP | 0581246 | 2/1994 |
| EP | 0 634 435 A1 | 1/1995 |
| EP | 0 378 154 B1 | 11/1995 |
| EP | 0699700 | 3/1996 |
| EP | 0541702 | 9/1996 |
| EP | 0465040 | 1/1997 |
| EP | 0884365 | 12/1998 |
| EP | 0921144 | 6/1999 |
| EP | 1065230 | 1/2001 |

| | | | | | |
|---|---|---|---|---|---|
| EP | 1152035 | 11/2001 | JP | 57038609 | 8/1982 |
| EP | 1 188 783 A2 | 3/2002 | JP | 58109532 | 6/1983 |
| EP | 1 431 337 A2 | 6/2004 | JP | 59-015427 | 1/1984 |
| EP | 1477506 | 11/2004 | JP | 60-31526 | 2/1985 |
| EP | 1227117 | 12/2004 | JP | 60139750 | 7/1985 |
| EP | 1516892 | 3/2005 | JP | 60-151826 | 8/1985 |
| EP | 1535944 | 6/2005 | JP | 60202148 | 10/1985 |
| EP | 1548046 | 6/2005 | JP | 60219226 | 11/1985 |
| EP | 1239006 | 7/2005 | JP | 60-264313 A | 12/1985 |
| GB | 673066 | 6/1952 | JP | 61-278558 | 12/1986 |
| GB | 1060401 | 3/1967 | JP | 61-291650 | 12/1986 |
| GB | 1236888 | 6/1971 | JP | 62-039208 | 2/1987 |
| GB | 1 242 636 | 8/1971 | JP | 62152715 | 7/1987 |
| GB | 1277264 | 6/1972 | JP | 62161827 | 7/1987 |
| GB | 1 285 904 | 8/1972 | JP | 62-177035 | 8/1987 |
| GB | 1337751 | 11/1973 | JP | 62207337 | 9/1987 |
| GB | 1351176 | 4/1974 | JP | 62297318 | 12/1987 |
| GB | 2 112 827 A | 7/1983 | JP | 63-237207 | 10/1988 |
| JP | 46-35500 | 10/1971 | JP | 63-264661 | 11/1988 |
| JP | 46040711 | 12/1971 | JP | 63-315604 | 12/1988 |
| JP | 46040713 | 12/1971 | JP | 62-182065 | 1/1989 |
| JP | 46040714 | 12/1971 | JP | 02194030 | 7/1990 |
| JP | 46041025 | 12/1971 | JP | 22-14734 | 8/1990 |
| JP | 46041031 | 12/1971 | JP | 3146707 | 6/1991 |
| JP | 46041033 | 12/1971 | JP | 3161509 | 7/1991 |
| JP | 47039497 | 11/1972 | JP | 3292323 | 12/1991 |
| JP | 47042989 | 12/1972 | JP | 4-270727 A | 9/1992 |
| JP | 48005798 | 1/1973 | JP | 4370142 | 12/1992 |
| JP | 48007272 | 3/1973 | JP | 5097990 | 4/1993 |
| JP | 48026955 | 7/1973 | JP | 5-117379 | 5/1993 |
| JP | 47039497 | 8/1973 | JP | 5-287067 | 11/1993 |
| JP | 48056782 | 8/1973 | JP | 05097990 | 11/1993 |
| JP | 48056783 | 8/1973 | JP | 6087953 | 3/1994 |
| JP | 48056784 | 8/1973 | JP | 6-100679 A | 4/1994 |
| JP | 47042989 | 9/1973 | JP | 06-184333 | 7/1994 |
| JP | 48-79896 | 10/1973 | JP | 6-220173 A | 8/1994 |
| JP | 48031991 | 10/1973 | JP | 1994215618 A | 8/1994 |
| JP | 48079898 | 10/1973 | JP | 62-71949 | 9/1994 |
| JP | 73035948 | 10/1973 | JP | 1994271494 | 9/1994 |
| JP | 48038634 | 11/1973 | JP | 62-78599 | 10/1994 |
| JP | 48038635 | 11/1973 | JP | 6286088 | 10/1994 |
| JP | 48038637 | 11/1973 | JP | 7133412 | 5/1995 |
| JP | 48044959 | 12/1973 | JP | 7224218 | 8/1995 |
| JP | 48099133 | 12/1973 | JP | 72-68188 | 10/1995 |
| JP | 48102191 | 12/1973 | JP | 1995268188 | 10/1995 |
| JP | 49005918 | 1/1974 | JP | 07292087 | 11/1995 |
| JP | 49010834 | 1/1974 | JP | 1996003301 | 1/1996 |
| JP | 49006835 | 2/1974 | JP | 1996283398 | 10/1996 |
| JP | 49006839 | 2/1974 | JP | 8325364 | 12/1996 |
| JP | 49009116 | 3/1974 | JP | 1997040850 | 2/1997 |
| JP | 49045014 | 4/1974 | JP | 9176464 | 7/1997 |
| JP | 49045015 | 4/1974 | JP | 9176465 | 7/1997 |
| JP | 50-5735 | 3/1975 | JP | 9183892 | 7/1997 |
| JP | 50-10196 | 4/1975 | JP | 09-256220 | 9/1997 |
| JP | 50039711 | 4/1975 | JP | 9272793 | 10/1997 |
| JP | 51042795 | 4/1976 | JP | 10316765 | 12/1998 |
| JP | 51127195 | 11/1976 | JP | 11005892 | 1/1999 |
| JP | 51145594 | 12/1976 | JP | 1999071106 | 3/1999 |
| JP | 52-039790 | 3/1977 | JP | 1999152324 | 6/1999 |
| JP | 52123489 | 10/1977 | JP | 11-181067 | 7/1999 |
| JP | 52129798 | 10/1977 | JP | 1999236440 | 8/1999 |
| JP | 52129799 | 10/1977 | JP | 11-349868 | 12/1999 |
| JP | 53051294 | 5/1978 | JP | 2000129102 | 3/2000 |
| JP | 53051295 | 5/1978 | JP | 2000128970 | 5/2000 |
| JP | 53052595 | 5/1978 | JP | 2000128971 | 5/2000 |
| JP | 53105591 | 9/1978 | JP | 2000226446 | 8/2000 |
| JP | 54135896 | 10/1979 | JP | 200302854 | 10/2000 |
| JP | 54163996 | 12/1979 | JP | 200126639 | 1/2001 |
| JP | 55089332 | 7/1980 | JP | 2001048972 A | 2/2001 |
| JP | 55115425 | 9/1980 | JP | 2001163964 | 6/2001 |
| JP | 55149320 | 11/1980 | JP | 2001262016 | 9/2001 |
| JP | 56008431 | 1/1981 | JP | 2002249648 | 9/2002 |
| JP | 56-149423 | 11/1981 | JP | 2002249653 | 9/2002 |

| | | |
|---|---|---|
| JP | 2002322254 | 11/2002 |
| JP | 2002322258 | 11/2002 |
| JP | 2002332337 | 11/2002 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003-268628 | 9/2003 |
| JP | 2003268093 | 9/2003 |
| JP | 2003301038 | 10/2003 |
| JP | 2003301090 | 10/2003 |
| JP | 2003301093 | 10/2003 |
| JP | 2003306536 | 10/2003 |
| JP | 2003306538 | 10/2003 |
| JP | 2003306541 | 10/2003 |
| JP | 2003306601 | 10/2003 |
| JP | 2004035659 | 2/2004 |
| JP | 2004035660 | 2/2004 |
| JP | 2004067733 | 3/2004 |
| JP | 2004149790 | 5/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| KR | 9303713 | 5/1993 |
| KR | 120831 | 7/1995 |
| KR | 9707952 | 5/1997 |
| KR | 2001089942 | 10/2001 |
| NL | 7113206 | 3/1972 |
| SU | 374343 | 7/1973 |
| WO | WO 95/02504 A1 | 1/1995 |
| WO | WO 96/03163 | 2/1996 |
| WO | WO 97/44376 | 11/1997 |
| WO | WO 98/41559 | 9/1998 |
| WO | WO 99/57173 | 11/1999 |
| WO | WO 01/14452 | 3/2001 |
| WO | WO 01/21680 | 3/2001 |
| WO | WO 01/46306 | 6/2001 |
| WO | WO 01/47688 | 7/2001 |
| WO | WO 01/90453 A1 | 11/2001 |
| WO | WO 02/18472 | 3/2002 |
| WO | WO 02/31840 A1 | 4/2002 |
| WO | WO 02/051616 | 7/2002 |
| WO | WO 02/068497 | 9/2002 |
| WO | WO 02/072665 | 9/2002 |
| WO | WO 03/010225 A1 | 2/2003 |
| WO | WO 2004/013015 A1 | 2/2004 |
| WO | WO 2004/031258 | 4/2004 |
| WO | WO 2004/065452 | 8/2004 |
| WO | WO 2004/067616 A1 | 8/2004 |
| WO | WO 2004/074365 | 9/2004 |
| WO | WO 2004/078825 | 9/2004 |
| WO | WO 2004/083294 A1 | 9/2004 |
| WO | WO 2004/101645 | 11/2004 |
| WO | WO 2005/068531 | 7/2005 |
| WO | WO 2005/075539 | 8/2005 |
| WO | WO 2005/075550 A1 | 8/2005 |
| WO | WO 2005/082527 | 9/2005 |
| WO | WO 2005/095516 | 10/2005 |
| WO | WO 2005/110508 A2 | 11/2005 |
| WO | WO 03-010226 | 2/2006 |
| WO | WO 2006/028757 A2 | 3/2006 |
| WO | WO 2006/028770 A1 | 3/2006 |

OTHER PUBLICATIONS

Fred W. Billmeyer, Jr., Methods for Estimating Intrinsic Vicosity, Journal of Polymer Science, 4, 1949, pp. 83-86, E.I. du Pont de Nemours and Co., Arlington, New Jersey.

Carl W. Fuller, Colored Iron Oxide Pigments, Synthetic Pigment Handbook, 1973, pp. 323-349, vol. 1, John Wiley and Sons, New York.

Fred W. Billmeyer, Jr., Principles of Color Technology, Describing Color, 1981, pp. 25-66, John Wiley and Sons, New York.

Kirk Othmer, Titanium and Titanium Alloys, Encyclopedia of Chemical Technology, vol. 24, 4$^{th}$ Ed., 1997, pp. 186-224; 225-349 and 801.

Louis E. Toth, Transition Metal Carbide and Nitrides, General Properties, Preparation and Characterization, 1971, p. 1-28, Academic Press New York + p. 87.

Kirk Othmer, Encyclopedia of Chemical Technology, vol. 17, 4$^{th}$ Ed., 1996, pp. 108-127.

Kirk Othmer, Encyclopedia of Chemical Technology, vol. 4, 4$^{th}$ Ed., 1992, pp. 841-848.

Kirk Othmer, Encyclopedia of Chemical Technology, vol. 4, 4$^{th}$ Ed., 1997, pp. 423-430.

Kirk Othmer, Encyclopedia of Chemical Technology, vol. 25, 4$^{th}$ Ed., 1998, pp. 872-873.

Kirk Othmer, Encyclopedia of Chemical Technology, vol. 23, 4$^{th}$ Ed., 1997, p. 676.

Kirk Othmer, Encyclopedia of Chemical Technology, vol. 6, 4$^{th}$ Ed., 1998, pp. 228-311.

Kirk Othmer, Encyclopedia of Chemical Technology, vol. 24, 4$^{th}$ Ed., 1998, pp. 572-602.

Kirk Othmer, Encyclopedia of Chemical Technology, vol. 14., 4$^{th}$ Ed., 1998, pp. 829-902.

Kirk Othmer, Encyclopedia of Chemical Technology, vol. 17, 4$^{th}$ Ed., 1998, pp. 1-42; 43-67.

Kirk Othmer, Encyclopedia of Chemical Technology, vol. 12, 4$^{th}$ Ed., 1998, pp. 863-881.

Kirk Othmer, Encyclopedia of Chemical Technology, vol. 22, 4$^{th}$ Ed., 1997, pp. 256-278.

D.C. Allport and A.A. Mohajer, Block Copolymers, 1973, pp. 264-270, John Wiley and Sons, New York.

M.E. Stewart, A.J. Cox, D.M. Naylor, Reactive Processing of poly(ethylene 2,6-naphthalene dicarboxylate)/poly(ethylene terephthalate) Blends, Polymer, 1993, pp. 4060-4067, vol. 34, No. 19; Butterworth-Heinemann Ltd.

Liu et al., Improving Oxygen Barrier Properties of Poly(ethylene terephthlate) by incorporating isophthalate. I. Effect of Orientation, Journal of Applied Science, Nov. 15, 2005, 98(4), pp. 1615-1628, Wiley Periodicals, Inc.

Co-pending U.S. Appl. No. 60/718,286, filed Sep. 16, 2005.
Co-pending U.S. Appl. No. 11/154,208, filed Jun. 16, 2005.
Co-pending U.S. Appl. No. 11/229,367, filed Sep. 16, 2005.
Co-pending U.S. Appl. No. 11/154,146, filed Jun. 16, 2005.
Co-pending U.S. Appl. No. 11/095,834, filed Mar. 31, 2005.
Co-pending U.S. Appl. No. 11/228,672, filed Sep. 16, 2005, CIP of U.S. Appl. No. 11/094,034, filed Mar. 30, 2005, CIP of U.S. Appl. No. 10/988,133, filed Nov. 12, 2004.
Co-pending U.S. Appl. No. 11/229,238, filed Sep. 16, 2005.
Research Disclosure 39771; Anonymous; May 1997.
A. Boehm amd A. Glaser, The quaterrylimides-highly efficient NIR absorbers for plastics, ANTEC paper 2004, Chicago, IL, May 2004.
Wu, S., A Generalized Criterion for Rubber Toughening: The Critical Matrix Ligament Thickness, Journal of Applied Polymer Science, vol. 35, pp. 549-561, 1988, John Wiley and Sons.

Weissmann, Mariana, et al.; "Theoretical study of cabon-coated iron nanowires"; Physical Review B70, 201401-1 through 201401-4; 2004; The American Physical Society.

Zhang, Z.D. et al.; "Shell/core structure and magnetic properties of carbon-coated Fe-Co © nanocapsules"; Journal of Physics: Condensed Matter 13; 1921-1929; 2001; Institute of Physics Publishing Ltd.

Pierson, H.O.; Handbook of Carbon, Graphite, Diamond and Fullerenes: Properties and Applications; pp. 122-140; Noyes Publications; 1993.

Hans Meerwein and Theodor Bersin, Investigations of Metal Alcoholates and Ortho Acid Esters, Annalen der Chemie, Chemical Institute of Marburg University, 1929, pp. 113-150, vol. 454765.

Hans Meerwein, Increase in Ionization Capacity of Weak Electrolytes as a Result of Complex Formation and its Significance for Catalytic Processes, Annalen der Chemie, Chemical Institute of Konigsberg University, 1927, pp. 222-253, vol. 455.

International Search report from co-pending U.S. Appl. No. 11/154,208, filed Jun. 16, 2005.

Terekhova, Mikhailov, Tokareva; Heat Stability of Polyethylene Terephthalate (PET) Containing Phosphoric Acid Esters; Khimicheskie Volokna; 1964; pp. 1-6; No. 4.

Terekhova; Petukhov; Blocking of Terminal Groups of Polyethylene Terephthalate with o-Phosphoric Acid; Nauka I Tekhnika (Science and Technology): Synthetic Fibers; pp 1-5; No. 2.

Kamatani, Konagaya, Nakamura; Effect of Phosphoric Acid on the Polycondensation of Bis(2-hydroxyethyl) Terephthalate Catalyzed by Sb(III) Compounds; Polymer Journal; 1980; pp. 125-130; vol. 12; No. 2.

International Search Report from co-pending U.S. Appl. No. 11/495,431; International Application No. PCT/US 06/34616.

Co-pending U.S. Appl. No. 11/495,431.

Co-pending U.S. Appl. No. 11/500,862.

Adams, G.C. et al., "Some studies of the crystallization of polychlorotrifluoroethylene copolymer films" J. Polymer Sci. A-2, vol. 6, No. 1, pp. 31-61; 1968.

Chen, et al.; "Preparation of nanosized titania powder via the controlled hydrolysis of titanium alkoxide"; Journal of Materials Science 31; pp. 3497-3500; 1996.

Co-pending U.S. Appl. No. 10/988,226, filed Nov. 12, 2004.

Co-pending U.S. Appl. No. 10/988,263, filed Nov. 12, 2004 (US Publication 2006/0105129).

Co-pending U.S. Appl. No. 10/996,924, filed Nov. 24, 2004 (US Publication 2006/0052504).

Co-pending U.S. Appl. No. 10/996,944, filed Nov. 24, 2004 (US Publication 2006/0051542).

Co-pending U.S. Appl. No. 10/997,040, filed Nov. 24, 2004 (US Publication 2006/0110557).

Co-pending U.S. Appl. No. 11/005,689, filed Dec. 7, 2004 (US Publication 2006/0122300).

Co-pending U.S. Appl. No. 11/054,194, filed Feb. 09, 2005 (US Publication 2006/0177614).

Co-pending U.S. Appl. No. 11/228,733, filed Sep. 16, 2005 (US Publication 2007/0066719).

Co-pending U.S. Appl. No. 11/228,773, filed Sep. 16, 2005 (US Publication 2007/0066714).

Co-pending U.S. Appl. No. 11/372,819, filed Mar. 10, 2006 (US Publication 2006/0205854).

Co-pending U.S. Appl. No. 11/373,251, filed Mar. 10, 2006 (US Publication 2006/0205855).

Co-pending U.S. Appl. No. 11/502,814, filed Aug. 11, 2006 (US Publication 2006/0276578).

Co-pending U.S. Appl. No. 11/524,056, filed Sep. 20, 2006 (US Publication 2007/0260002).

Co-pending U.S. Appl. No. 12/073,244, filed Mar. 3, 2008 (US Publication 2008/0153962).

Co-pending U.S. Appl. No. 12/200,976, filed Aug. 29, 2008 (US Publication 2008/0319113).

Encyclopedia of Polymer Science and Engineering; vol. 12, 1988; pp. 226-227.

International Preliminary Report on Patentability and Written Opinion of the International Searching Authority, date of mailing Aug. 14, 2007 for International Appl. No. PCT/US2005/038999, counterpart of co-pending U. S. Appl. No. 11/228,672.

International Search Report and the Written Opinion of the International Searching Authority, date of mailing Mar. 14, 2006 for International Appl. No. PCT/US2005/042471.

International Search Report and the Written Opinion of the International Searching Authority, date of mailing Feb. 28, 2006 for International Appl. No. PCT/US2005/038730.

International Search Report and the Written Opinion of the International Searching Authority, date of mailing May 17, 2006, on the PCT filing, International Appl. No. PCT/US2006/003874, of the co-pending U. S. Appl. No. 11/054,194 date of filing Feb. 9, 2005.

International Search Report and the Written Opinion of the International Searching Authority, date of mailing Apr. 7, 2006, on the PCT filing, International Appl. No. PCT/US2005/038606, of the co-pending U. S. Appl. No. 10/988,263 date of filing Nov. 12, 2004.

International Search Report and the Written Opinion of the International Searching Authority, date of mailing Nov. 17, 2006, on the PCT filing, International Appl. No. PCT/US2006/34413, of the co-pending U.S. Appl. No. 11/228,773 date of filing Sep. 16, 2005.

International Search Report and the Written Opinion of the International Searching Authority, date of mailing Feb. 15, 2007 for International Appl. No. PCT/US2005/030834.

Office Action in co-pending U.S. Appl. No. 10/988,226, dated Nov. 29, 2005.

Office Action in co-pending U.S. Appl. No. 10/988,226, dated Nov. 8, 2006.

Office Action in co-pending U.S. Appl. No. 10/988,263, dated Jan. 22, 2009.

Office Action in co-pending U.S. Appl. No. 10/988,263, dated May 13, 2008.

Office Action in co-pending U.S. Appl. No. 10/988,263, dated Sep. 6, 2007.

Office Action in co-pending U.S. Appl. No. 10/996,924, dated Oct. 1, 2008.

Office Action in co-pending U.S. Appl. No. 10/996,924, dated Mar. 17, 2008.

Office Action in co-pending U.S. Appl. No. 10/996,944, dated Feb. 20, 2008.

Office Action in co-pending U.S. Appl. No. 10/996,944, dated Jul. 30, 2008.

Office Action in co-pending U.S. Appl. No. 10/996,944, dated Oct. 4, 2007.

Office Action in co-pending U.S. Appl. No. 10/997,040, dated Apr. 2, 2008.

Office Action in co-pending U.S. Appl. No. 10/997,040, dated Aug. 20, 2008.

Office Action in co-pending U.S. Appl. No. 10/997,040, dated Sep. 7, 2007.

Office Action in co-pending U.S. Appl. No. 11/005,689, dated Dec. 27, 2007.

Office Action in co-pending U.S. Appl. No. 11/005,689, dated May 29, 2007.

Office Action in co-pending U.S. Appl. No. 11/005,689, dated Dec. 7, 2005.

Office Action in co-pending U.S. Appl. No. 11/005,689, dated Jun. 8, 2006.

Office Action in co-pending U.S. Appl. No. 11/005,689, dated May 21, 2008.

Office Action in co-pending U.S. Appl. No. 11/005,689, dated Sep. 30, 2008.

Office Action in co-pending U.S. Appl. No. 11/005,689, dated Nov. 8, 2006.

Office Action in co-pending U.S. Appl. No. 11/005,689, dated Oct. 18, 2007.

Office Action in co-pending U.S. Appl. No. 11/054,194, dated, Jan. 9, 2009.

Office Action in co-pending U.S. Appl. No. 11/054,194, dated Feb. 6, 2008.

office Action in co-pending U.S. Appl. No. 11/054,194, dated Jul. 21, 2008.

Office Action in co-pending U.S. Appl. No. 11/094,034, dated Aug. 1, 2005.

Office Action in co-pending U.S. Appl. No. 11/095,834, dated May 28, 2008.
Office Action in co-pending U.S. Appl. No. 11/095,834, dated Oct. 16, 2008.
Office Action in co-pending U.S. Appl. No. 11/095,834, dated Jan. 28, 2009.
Office Action in co-pending U.S. Appl. No. 11/228,672, dated Jan. 22, 2007.
Office Action in co-pending U.S. Appl. No. 11/228,672, dated Jul. 20, 2006.
Office Action in co-pending U.S. Appl. No. 11/228,672, dated Jun. 12, 2007.
Notice of Allowance in co-pending U.S. Appl. No. 11/228,672, dated Dec. 19, 2007.
Office Action in co-pending U.S. Appl. No. 11/228,733, dated Apr. 29, 2008.
Office Action in co-pending U.S. Appl. No. 11/228,733, dated Sep. 9, 2008.
Office Action in co-pending U.S. Appl. No. 11/228,733, dated Dec. 31, 2008.
Office Action in co-pending U.S. Appl. No. 11/228,773, dated Apr. 29, 2008.
Office Action in co-pending U.S. Appl. No. 11/228,773, dated Sep. 9, 2008.
Office Action in co-pending U.S. Appl. No. 11/228,773, dated Dec. 30, 2008.
Office Action in co-pending U.S. Appl. No. 11/372,819, dated Jun. 21, 2007.
Office Action in co-pending U.S. Appl. No. 11/372,819, dated May 30, 2008.
Office Action in co-pending U.S. Appl. No. 11/372,819, dated Nov. 14, 2007.
Office Action in co-pending U.S. Appl. No. 11/372,819, dated Dec. 3, 2008.
Office Action in co-pending U.S. Appl. No. 11/373,251, dated Jul. 28, 2008.
Office Action in co-pending U.S. Appl. No. 11/373,251, dated Dec. 11, 2008.
Office Action in co-pending U.S. Appl. No. 11/502,814, dated Feb. 6, 2008.
Notice of Allowance in co-pending U.S. Appl. No. 11/502,814, dated Jul. 15, 2008.
Office Action in co-pending U.S. Appl. No. 11/524,056, dated Feb. 20, 2009.
Office Action in Russian Application 2005141452, dated Jul. 14, 2008.
Peelamedu, et al.; "TiN from Ti02 via Cycling Microwave"; American Ceramic Society Bulletin; vol. 81; No. 8; pp. 57-60; Aug. 2002.
Research Disclosure, vol. 167, No. 010, Mar. 1978, Havant GB, p. 4, Anonymously; "Titanium catalyst for polyester synthesis".
U.S. Appl. No. 10/933,975, filed Sep. 3, 2004.
U.S. Appl. No. 10/934,546, filed Sep. 3, 2004.
U.S. Appl. No. 10/934,897, filed Sep. 3, 2004.
U.S. Appl. No. 11/094,034, filed Mar. 30, 2005.
U.S. Appl. No. 60/797,452, filed May 4, 2006.
U.S. Appl. No. 10/988,133, filed Nov. 12, 2004.
Wilfong, R.E.; "Linear Polyesters" Journal of Polymer Science; 54, 385-410 (1961).
www.americanelements.com, 2001.
Yuki, K. Saturated Polyester Resin Handbook; Nikkan Kogyo Shinnbunsha; Dec. 22, 1989; pp. 217-228 and 593-594.
International Search Report and the Written Opinion of the International Searching Authority, date of mailing Feb. 16, 2006 for International Appl. No. PCT/US2005/030551.
International Search Report and the Written Opinion of the International Searching Authority, date of mailing Jun. 26, 2006 for International Appl. No. PCT/US2006/009692.
International Search Report and the Written Opinion of the International Searching Authority, date of mailing Feb. 13, 2007 for International Appl. No. PCT/US2006/034412.
International Search Report and the Written Opinion of the International Searching Authority, date of mailing Feb. 1, 2006 for International Appl. No. PCT/US2005/030657.
International Search Report and the Written Opinion of the International Searching Authority, date of mailing Sep. 3, 2007 for International Appl. No. PCT/US2007/09914.
Li et al.; "Synthesis of Nanocrystalline Titanium Nitride Powders by Direct Nitridation of Titanium Oxide" J. Am. Ceramic Society, vol. 84; No. 12; pp. 3045-3047; 2001.
Letter to Examiner Regarding Specification, dated Mar. 11, 2009.
Notice of Allowance in co-pending U.S. Appl. No. 10/988,226, dated Aug. 1, 2007.
Office Action in co-pending U.S. Appl. No. 10/988,226, dated May 11, 2006.
Office Action in co-pending U.S. Appl. No. 10/988,226, dated Jun. 5, 2007.
International Search Report and Written Opinion mailed Aug. 20, 2007 in corresponding PCT application PCT/US2006/34543.
International Search Report and Written Opinion mailed Nov. 22, 2006 in corresponding PCT application PCT/US2006/034524.
International Search Report and Written Opinion mailed Jan. 15, 2007 in corresponding PCT application PCT/US2006/034551.
International Search Report and Written Opinion mailed Dec. 19, 2006 in corresponding PCT application PCT/US2006/23207.
International Search Report and Written Opinion mailed Apr. 9, 2007 in corresponding PCT application PCT/US2006/34487.
Love, C.H. "Colored Iron Oxide Pigments, Natural: I-C-a-1" in *Pigment Handbook*, Patton, T.C. (ed.), John Wiley, New York, 1973; pp. 323-332.
Office Action mailed Sep. 29, 2008 in co-pending U.S. Appl. No. 11/500,862.
Office Action mailed Apr. 29, 2008 in co-pending U.S. Appl. No. 11/229,238.
Office Action mailed Dec. 18, 2008 in co-pending U.S. Appl. No. 11/229,238.
Office Action mailed Jun. 9, 2008 in co-pending U.S. Appl. No. 11/495,431.
Office Action mailed Dec. 15, 2008 in co-pending U.S. Appl. No. 11/495,431.
Office Action mailed Aug. 6, 2008 in co-pending U.S. Appl. No. 11/154,208.
Office Action mailed Jan. 12, 2009 in co-pending U.S. Appl. No. 11/154,208.

\* cited by examiner

PHOSPHORUS CONTAINING COMPOUNDS FOR REDUCING ACETALDEHYDE IN POLYESTERS POLYMERS

FIELD OF THE INVENTION

The present invention pertains to a process for reducing acetaldehyde formation in polyesters susceptible to the formation of acetaldehyde, i.e., those containing —OCH$_2$CH$_2$O— in a repeat unit and in particular to polyethylene terephthalate ("PET") and to PET prepared thereby. Polyesters can be prepared by melt polycondensation, with or without subsequent solid state polymerization.

BACKGROUND ART

Polyethylene terephthalate ("PET") is used extensively in packaging applications, in particular as beverage containers. In these applications, it is important that the PET have a relatively high molecular weight, generally expressed as inherent viscosity ("IhV") or intrinsic viscosity ("It.V."), and low amounts of acetaldehyde.

There are two types of acetaldehyde (AA) to be concerned about. The first is residual or free AA contained in the pellets or particles sent to preform molders. The second type of AA is preform AA or the AA generated when the PET pellets are melt processed to make bottle preforms. AA precursors in the pellets can be converted to AA upon melting and give unacceptable levels of AA in the preforms. Melt processing also forms more AA precursors, which can liberate AA. Acetaldehyde has a noticeable taste and can be detected by human taste buds at low levels. When the preforms are blown into bottles, unacceptably high AA levels are those that adversely impact the taste of the beverage contained in the said bottles.

Relatively tasteless beverages such as water are particularly negatively impacted by the strong taste of AA. Many water bottle applications require lower levels of preform AA than carbonated soft drink ("CSD") bottle applications. Converters who take polyester particles and make bottle preforms would like to have one resin that could be used to make preforms for both water and CSD applications. This would simplify the materials handling process at the converter by allowing for one feed silo or one type of feed silo, one product storage area or one type of product storage area etc. Most resins sold into water bottle markets have a lower It.V. than those resins sold into CSD markets. A dual use resin would have to a high enough It.V. for CSD applications and a low enough AA generation rate upon melting for water bottle applications.

In order to use one resin, some converters are adding AA scavengers to CSD resins to get acceptable preform AA for the water market. AA scavengers add significant cost to the container and often negatively impact the color of the container by making it either more yellow or darker as compared to an analogous container without AA scavenger added.

The conventional PET production process begins with esterification of predominantly terephthalic acid and ethylene glycol, or ester exchange of predominantly dimethyl terephthalate and ethylene glycol. The esterification need not be catalyzed. Typical ester exchange catalysts, which may be used separately or in combination, include titanium alkoxides, tin (II) or (IV) esters, zinc, manganese or magnesium acetates or benzoates and/or other such catalyst materials that are well known to those skilled in the art. The resulting mixture is then subjected to polycondensation in the melt at elevated temperature, for example 285° C., in the presence of a suitable catalyst. Compounds of Sn, Sb, Ge, Ti, or others have been used as polycondensation catalysts.

Following melt phase polycondensation, which generally achieves an inherent viscosity in the range of 0.5 to 0.65, the polyester is extruded, cooled, and cut into granules, which are then subjected to a crystallization process wherein at least the exterior of the granules becomes crystalline. This crystallinity is necessary to prevent sintering and agglomeration in a subsequent solid state polymerization. Crystallization and annealing take place in a fluidized bed at temperatures of, for example 160-220° C., for several hours, as discussed by WO 02/18472 A2, and U.S. Pat. Nos. 4,161,571; 5,090,134; 5,114,570; and 5,410,984.

Solid state polymerization or "solid stating" takes place in a fluidized bed over a period of from 10 to 20 hours, at a temperature which is preferably in the range of 180° C. to a temperature which is lower than the crystalline melt temperature by at least 10° C. Volatiles are removed in vacuo or by a flow of inert gas (e.g., nitrogen), or at lower temperatures, e.g. 180° C. or lower, by means of a flow of air. A variation in this process is disclosed in U.S. Pat. No. 5,393,871 where nitrogen containing water vapor is flowed through the solid stater.

Solid stating has the advantage that relatively high inherent viscosities can be achieved. It has the further advantage that acetaldehyde content of the polymer is lowered substantially by the removal of acetaldehyde by volatilization. Solid stating has the considerable disadvantages of high energy usage and long processing time. Finally, solid state polymerization causes the pellets to develop shell-to-core molecular weight gradients, which results in a loss in inherent viscosity during the molding of articles that is theorized to be due to re-equilibration in the melt.

It would be desirable to eliminate solid stating, but to do so would require more extended melt-phase polycondensation. In the absence of solid stating, removal of acetaldehyde present at the end of the melt phase polycondensation needs to be addressed. The situation is further complicated by the presence of acetaldehyde precursors which may later generate acetaldehyde, i.e., during injection molding of PET bottle preforms. Without solid stating, acetaldehyde precursors may remain at the concentration present after the melt-phase polycondensation.

When antimony catalysts are used for polycondensation, phosphorous compounds have been added to assist in lowering acetaldehyde and acetaldehyde precursors. However, antimony is not the most active catalyst, and deactivation of antimony with phosphorus compounds, if not performed carefully, may generate haze in the product. Titanium compounds are known to be much more active polycondensation catalysts, and can reduce the polycondensation time significantly. However, titanium compounds, when employed in PET production, often produce polymers with higher residual acetaldehyde, and can also result in greater generation of acetaldehyde downstream from polymer production per se, for example during the molding of preforms. Titanium catalysts also impart a distinct yellow cast to the product as well.

U.S. Pat. No. 5,656,716 discloses use of high surface area titanium catalysts followed by addition of triphenyl phosphate. Without the triphenyl phosphate, a high inherent viscosity but distinctly yellow product was obtained, while with triphenyl phosphate, less colored products are obtained, but only at a low inherent viscosity, thus requiring solid stating of these products with its disadvantages.

In WO 02/079310 A2, polyesters are stabilized against generation of aldehydes through addition of one of a diverse population of stabilizers, including sterically hindered amines such as Tinuvin® 123 or Tinuvin® 622 during initial esterification or transesterification. However, no salts of phosphorus-containing acids with these stabilizers are disclosed, nor is their addition late in a melt-phase polycondensation process.

In U.S. published application 2002/0198297 A1, nitrogenous stabilizers selected from hydroxylamines, substituted hydroxylamines, nitrones, and amine oxides are employed to scavenge acetaldehyde generated during extrusion of polyesters or polyamides. No salts made from these nitrogenous-stabilizers with phosphorus-containing acids are disclosed, nor is addition late in the melt-phase polycondensation stage of polyester production.

In World published application 2004/074365 A1, salts are made of hindered amine light stabilizers (HALS) derivatives and organophosphorus acids. Addition of amine salts to polyesters during the melt-phase manufacturing is not disclosed, nor is reduction of acetaldehyde.

In copending U.S. application Ser. Nos. 10/639,712; 10/772,121; and 10/393,475, the disclosures of which are each incorporated herein fully by reference, phosphorus-containing acid salts of various amines and hindered amines are added during extrusion and disclosed as useful in maintaining polycarbonate molecular weight during extrusion of polyester/polycarbonate blends, while reducing color as well. Addition of amine salts to polyesters during the melt-phase manufacturing is not disclosed, nor is reduction of acetaldehyde. It would be desirable to be able to produce PET and other polyesters with an inherent viscosity suitable for production of food and beverage containers, without the necessity for solid stating, which exhibit lower content of acetaldehyde, and/or which generate reduced levels of acetaldehyde during further processing. It would further be desirable to produce PET in shorter reaction time, due to a more active catalyst than antimony, while maintaining or improving upon the AA properties of the product, with or without solid state polymerization.

SUMMARY OF THE INVENTION

It has now been surprisingly discovered that polyesters susceptible to acetaldehyde formation can be continuously produced in a melt phase process to have high inherent viscosity and low acetaldehyde content without solid stating polymerizing the polyester by polycondensing hydroxyl end groups of an ester linkage containing melt in the presence of a titanium polycondensation catalyst followed by adding a class of additives comprising phosphorus-containing acid salts of amines, preferably hindered amines containing both piperidine and triazine rings, late in the melt-phase polycondensation stager, i.e. after the It.V. of the polymer melt reaches 0.45 dL/g or higher, preferably 0.60 dL/g or higher, most preferably 0.75 dL/g or higher and prior to solidifying, e.g. cutting into pellets. For example, the additives may be added anywhere between the last reactor and a pelletizer, such as after a gear pump and prior to a filter. The additive may also be added near the end of last reactor. The additive may be introduced as a polymer concentrate or in a liquid carrier, or may be added neat (without dilution). The color of the Ti-catalyzed product is not adversely affected by the presence of the additives. If desired, the inherent viscosity may be further elevated by solid state polymerization.

DETAILED DESCRIPTION OF THE INVENTION

Figure 1:
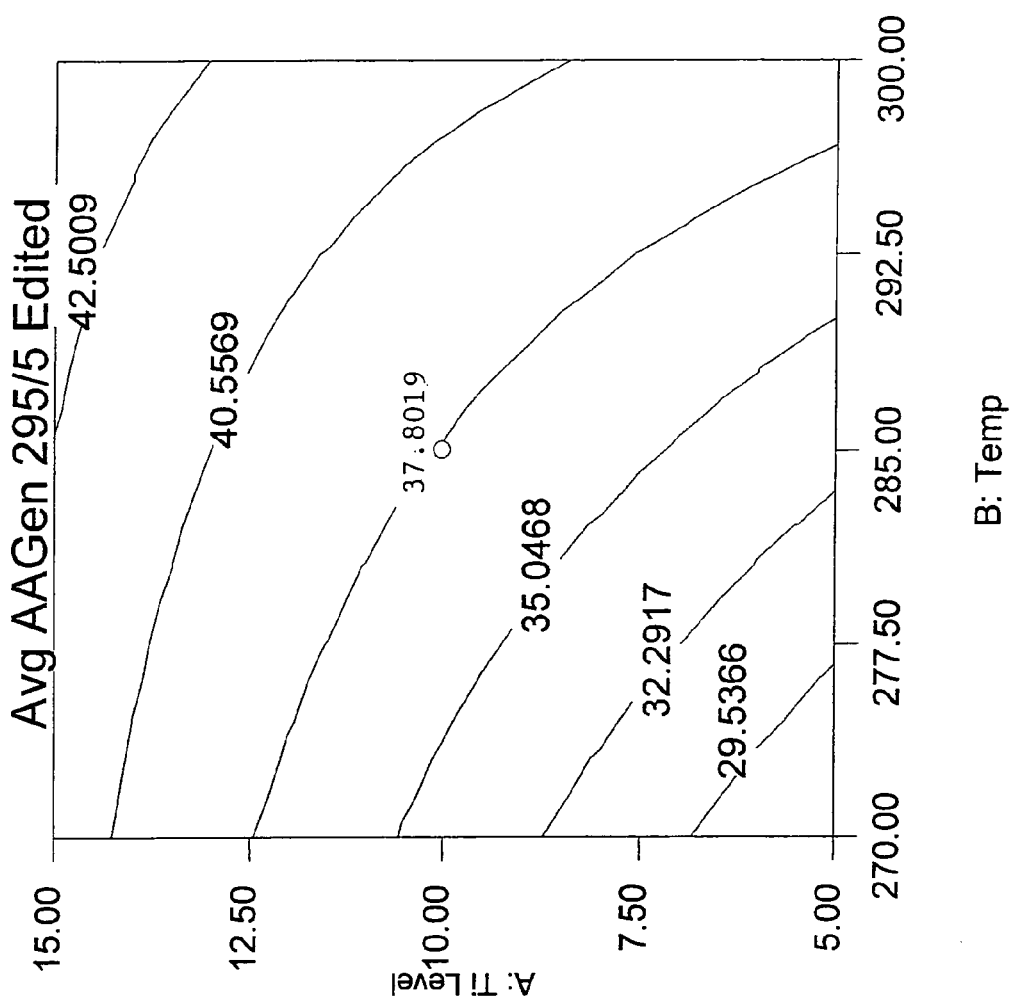
FIG. 1 is a contour plot of acetaldehyde generation with respect to Ti catalyst level and temperature, without addition of any acetaldehyde reducing additive.

Suitable polyesters are generally known in the art and may be formed from aromatic or aliphatic dicarboxylic acids, esters of dicarboxylic acids, anhydrides of dicarboxylic acids, acid chlorides of dicarboxylic acids, glycols, epoxides and mixtures thereof. More preferably the polyesters are formed from diacids such as terephthalic acid, isophthalic acid, and 2,6-naphthalenedicarboxylic acid, and mixtures thereof, and diols such as ethylene glycol, diethylene glycol, 1,4-cyclohexanedimethanol, 1,4-butanediol, and mixtures thereof.

The process of the present invention can produce PET polyesters, which includes "modified" polyesters. Examples of suitable polyester polymers made by the process include polyalkylene terephthalate homopolymers and copolymers modified with one or more modifiers in an amount of 40 mole % or less, preferably less than 15 mole %, most preferably less than 10 mole %. Unless otherwise specified, a polymer includes both its homopolymer and copolymer variants. The preferred polyester polymer is a polyalkylene terephthalate polymer, and most preferred is polyethylene terephthalate polymer. By "modified" it is meant that the preferred diacid component and/or diol component are substituted in part with one or more different diacid and/or diol components.

For example, the preferred diol component, e.g., ethylene glycol in the case of PET, may be substituted in part with one or more different diol components, and/or the preferred dicarboxylic acid component, e.g., terephthalic acid, in the case of PET, may be substituted in part with one or more different dicarboxylic acid components. The mole percentage for all the diacid component(s) totals 100 mole %, and the mole percentage for the entire diol component(s) totals 100 mole %.

For example, the dicarboxylic acid component of the polyester may optionally be substituted with up to about 20 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid include: phthalic acid, isophthalic acid, naphthalene-2,6-dicarboxylic acid, 1,4-cyclohexanedicarboxylic acid, 1,3-cyclohexanedicarboxylic acid, stilbene dicarboxylic acid, cyclohexanediacetic acid, 1,12-dodecanedioic acid, diphenyl-4,4'-dicarboxylic acid, succinic acid, glutaric acid, adipic acid, azelaic acid, sebacic acid, mixtures thereof and the like. Polyesters may be prepared from two or more of the above dicarboxylic acids. Moreover, the foregoing dicarboxylic acids, which exist as stereoisomers, may be in their cis-form, trans-form, or as mixtures thereof.

In addition, the glycol component may optionally be substituted with up to about 20 mole percent, of one or more diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,2-diol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, hexane-1,3-diol, 1,4-di (hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis-(4-hydroxypropoxyphenyl)-propane, 1,2-cyclohexanediol, 1,4-cyclohexanediol, mixtures thereof and the like. Polyesters may be prepared from two or more of the above diols. Moreover, the foregoing diols, which exist as stereoisomers, may be in their cis-form, trans-form, or as mixtures thereof. It should be noted in this respect that presence of ethylene glycol residues, —OCH$_2$CH$_2$O—, is paramount, since in the absence of such residues, acetaldehyde generation is not problematic.

The resins may optionally contain polyfunctional monomers, e.g., trifunctional or tetrafunctional comonomers such as trimellitic anhydride, trimellitic acid, trimethylolpropane, pyromellitic dianhydride, pentaerythritol, and the like. However, these are not generally preferred, and when used, are generally used in most minor amounts.

The polyester compositions of the invention can be prepared by polymerization procedures known in the art sufficient to effect esterification and polycondensation. Polyester melt phase manufacturing processes include condensation of at least one dicarboxylic acid with at least one diol, optionally in the presence of esterification catalysts in an esterification zone, followed by polycondensation in the presence of a polycondensation catalyst in a polymerization zone which may in some instances be divided into a prepolymer zone and in the finishing zone; or ester exchange, usually in the presence of a transesterification catalyst in the ester exchange zone, followed in the presence of a polycondensation catalyst by a prepolymerization zone and finishing zone. Each of the polymers obtained may optionally be solid stated according to known methods.

To further illustrate, a mixture of one or more dicarboxylic acids, preferably aromatic dicarboxylic acids, or ester forming derivatives thereof, and one or more diols, are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid(s) is/are directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer and/or oligomers. The monomer and/or oligomer reaction(s) are typically uncatalyzed in the direct esterification process and catalyzed in ester exchange processes.

Polycondensation catalysts may optionally be added in the esterification zone along with esterification/ester exchange catalysts. If the catalyst forms an insoluble salt with the dicaroxylic acid(s), the catalyst is added after the esterification zone. If a polycondensation catalyst was added to the esterification zone, it is typically blended with the diol and fed into the esterification reactor. Typical ester exchange catalysts which may be added to the ester exchange zone or reactor(s), and which may be used separately or in combination, include titanium alkoxides, tin (II) or (IV) esters, manganese, or magnesium acetates or benzoates and/or other such catalyst materials as are well known to those skilled in the art. Phosphorus containing compounds and some colorants may also be present in the esterification zone. Phosphorus containing compounds are not recommended to be present in an ester exchange zone as the ester exchange catalysts will be deactivated prematurely. To maximize rate and the effectiveness of the salt, it is preferable to wait and add all the phosphorus in the form of the salt near or at the end of the melt-phase process.

The resulting products formed in the esterification zone include bis(2-hydroxyethyl)terephthalate (BHET) monomer, low molecular weight oligomers, DEG, and water (or alcohol in the case of ester exchange) as the condensation by-product, along with other trace impurities formed by the reaction of the catalyst, if any, or by the reaction of starting materials and other compounds such as colorants, impurities in the starting materials or the phosphorus-containing compounds, if any. The relative amounts of BHET and oligomeric species will vary depending on whether the process is a direct esterification process in which case the amount of oligomeric species are significant and even present as the major species, or an ester exchange process in which case the relative quantity of BHET predominates over the oligomeric species. The water is removed as the esterification reaction proceeds to drive the equilibrium toward products. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain the monomeric species bis(2-hydroxyethyl)naphthalate and its corresponding oligomers, in lieu of BHET and its corresponding oligomers which will be present when making PET.

Once the desired degree of esterification is completed, the reaction mixture is transported from the esterification reactors in the esterification zone to the polycondensation zone, which may comprise a prepolymer zone and a finishing zone. Polycondensation reactions are initiated and continued in the melt phase in the prepolymerization zone and finished in the melt phase in the finishing zone, after which the melt is solidified into product, or optionally precursor, solids in the form of chips, pellets, or any other shape. The solids can be optionally crystallized before or after cutting.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers are polymerized via polycondensation to form polyethylene terephthalate polyester (or PEN polyester, etc.) in the presence of a catalyst. If the polycondensation catalyst was not added in the esterification stage, the catalyst is added at this stage to catalyze the reaction between the monomers and low molecular weight oligomers to form prepolymer and split off the diol as a by-product. Other compounds such as phosphorus containing compounds, cobalt compounds, and colorants can also be added in the prepolymerization zone. These compounds may, however, be added in the finishing zone instead of or in addition to the prepolymerization zone and esterification zone. In a direct esterification process, phosphorus containing compounds are preferably added near the end or at the end of the melt-phase process in the form of salts of the invention. In a typical DMT-based process, those skilled in the art recognize that other catalyst material and points of adding the catalyst material and other ingredients such as phosphorus compounds vary from a typical direct esterification process.

In the present application, polycondensation takes place in the presence of a titanium catalyst, preferably in the presence of from about 3 ppm (parts per million) to about 35 ppm of titanium from the catalyst, more preferably about 6-15 ppm titanium from the catalyst, in each case based on the weight of titanium in the polymer. During the polycondensation, preferably following completion of 90% or more of the total polycondensation time, an amine salt of a phosphorus-containing acid is added, preferably in amounts to supply of about 250 ppm phosphorus or less, more preferably about 5 to 90 ppm, and most preferably 15 to 80 ppm. The amounts are calculated in terms of the weight of elemental phosphorus relative to the weight of the polymer. The mole ratio of phosphorus to Ti (regardless of oxidation state) is preferably from about 1 to about 15, more preferably from 2.5 to 13.

The titanium catalyst may be any titanium compound which exhibits a reasonable polycondensation rate. Preferably, the catalyst exhibits at least the same rate of polycondensation as is achieved using antimony triacetate or antimony trioxide, and more preferably exhibits a considerably greater rate of polycondensation in the absence of phosphorus compounds, for example a rate from 10 to 50 times higher than antimony triacetate or antimony trioxide, based in part on the weight of the catalytic element relative to the weight of the polymer. It has been found, for example, that a polyester of suitable inherent viscosity can be produced under similar conditions in shorter time than in an antimony catalyzed polycondensation, while also using much less catalyst. The titanium catalyst can be added anywhere in the melt phase process, such as into the esterification zone or the polycondensation zone. It is preferably added after at least 90% conversion in the esterification zone, or after completing esterification (which includes ester exchange), or between the esterification zone and the polycondensation zone, or to the beginning of polycondensation, or during prepolymerization.

Preferred titanium catalysts include, in general, titanium (IV) compounds which are alkoxides, glycolates, acetates, oxalates, etc. Alkoxides and mixed glycolate alkoxides are preferred. Titanium (IV) isopropoxide is an example of a preferred catalyst. Many such catalysts are available commercially, i.e., under the trademark Tyzor® titanates from DuPont. Solid titanium compounds which serve as heterogenous catalysts are also suitable, including those disclosed in U.S. Pat. No. 5,656,716, incorporated herein by reference. Titanium oxides and hydrated oxides may become solubilized during the course of the polymerization, for example by complexation and/or reaction with the glycol component. If catalysts remain insoluble, at least in part, catalytic activity would be a concern, as would haze (lack of clarity). Soluble catalysts are preferred, more preferably, those catalysts which are soluble at the outset of the reaction. The titanium catalysts may be introduced into the reaction in any convenient manner. A solution of the catalyst in alcohol or a slurry of the catalyst in ethylene glycol may be used, for example, as may be a solution or slurry of the catalyst in an oligomer mixture. The catalyst may also be added alone, and distributed by agitation, i.e., by mechanical mixing or by use of a static mixer.

This prepolymer polycondensation stage generally employs a series of one or more vessels and is operated at a temperature of between about 250° C. and 305° C. for a period between about five minutes to four hours. During this stage, the It.V. of the monomers and oligomers is increased up to about no more than 0.48 dL/g. The diol byproduct is removed from the prepolymer melt using an applied vacuum ranging from 4 to 70 torr to drive the reaction to completion. In this regard, the polymer melt is sometimes agitated to promote the escape of the diol from the polymer melt. As the polymer melt is fed into successive vessels, the molecular weight and thus the inherent viscosity of the polymer melt increases. The pressure of each vessel is generally decreased to allow for a greater degree of polymerization in each successive vessel or in each successive zone within a vessel. To facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once an It.V. of no more than about 0.48 dL/g is obtained, the prepolymer is fed from the prepolymer zone to a polycondensation finishing zone where the polycondensation is continued further in one or more finishing vessels generally, but not necessarily, ramped up to higher temperatures than present in the prepolymerization zone, to a value within a range of from 270° C. to 305° C. until the It.V. of the melt is increased from the It.V. of the melt in the prepolymerization zone (typically 0.20 to 0.30 dL/g but usually not more than 0.48 dL/g) to an It.V in the range of from about 0.54 dL/g to about 1.2 dL/g. The final vessel, generally known in the industry as the "high polymerizer," "finisher," or "polycondenser," is operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically agitated to facilitate the removal of ethylene glycol.

Once the desired It.V. is obtained in the finisher, the melt is generally processed to convert the molten PET into amorphous solid pellets. The technique used for making a pellet is not limited. A suitable It.V. from the melt phase can range from 0.5 dL/g to 1.15 dL/g. However, one advantage of the present process is that the solid stating step can optionally be avoided. Solid stating is commonly used for increasing the molecular weight (and the It.V.) of the pellets in the solid state, usually by at least 0.05 units, and more typically from 0.1 to 0.5 units. Therefore, in order to avoid a solid stating step, a preferred It.V. from the melt phase, which can be measured on the amorphous pellets, is from at least 0.7 dL/g, or at least 0.72 dL/g, or at least 0.75 dL/g, or at least 0.78 dL/g, and up to about 1.15 dL/g to 1.20 dL/g.

The method and equipment for converting molten polymer in the melt phase reactors to pellets is not limited, and any conventional system used for making pellets is suitable in the practice of the invention. For example, strands of the polyester polymer melt are at least surface cooled to below the $T_g$ of the polymer to form a cooled polyester polymer, followed by pelletizing the cooled polyester polymer to form solid amorphous pellets. These pellets may be optionally crystallized.

Alternatively, the molten polymer may be extruded through a die and instantly cut into pellets before the polyester polymer cools below its $T_g$. These pellets may be optionally crystallized before the polymer cools below its $T_g$.

Preferably, the It.V of a polyester of this invention is from about 0.70 dL/g to about 1.2 dL/g. The It.V. can be determined from the inherent viscosity is measured at 25° C. using 0.50 grams of polymer per 100 mL of a solvent consisting of 60% by weight phenol and 40% by weight 1,1,2,2-tetrachloroethane. The intrinsic viscosity is typically reported as the It.V. of the polymer, which is a number calculated from the measured Ih.V. according to the equation set forth in the Example section.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, and the like.

In addition, certain agents which color the polymer can be added to the melt. A bluing toner can be added to the melt in order to reduce the b* of the resulting polyester polymer melt phase product. Such bluing agents include blue inorganic and organic toners. In addition, red toners can also be used to adjust the a* color.

Organic toners, e.g., blue and red organic toners, such as those described in U.S. Pat. Nos. 5,372,864 and 5,384,377, which are incorporated by reference in their entirety, can be used. The organic toners can be fed as a premix composition. The premix composition may be a neat blend of the red and blue compounds or the composition may be pre-dissolved or slurried in one of the polyester's raw materials, e.g., ethylene glycol.

Alternatively, or in addition to, inorganic bluing agents can also be added to the melt to reduce its yellow hue. Cobalt (II) compounds, such as cobalt (II) carboxylates, are one of the most widely used toners in the industry to mask the yellow color of polymers. When direct esterification is not being used, the cobalt carboxylate can be added to the ester exchange reactor to also act as an ester exchange catalyst.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toners can be added to the esterification zone or to the polycondensation zone. Preferably, the toners are added to the esterification zone or to the early stages of the polycondensation zone, such as to a prepolymerization reactor.

In one preferred embodiment, the subject process differs substantially from prior processes in that it is capable of producing a product of sufficiently high inherent viscosity directly in the melt phase, without involving any necessity for a subsequent solid state polymerization, usually termed "solid stating." Avoidance of solid stating also may even allow direct molding from the melt. These advantages are achieved through the use of titanium catalysts in conjunction with amine salts of phosphorus-containing acids, which are added late in the polycondensation stage. It has been surprisingly discovered that the present method allows a reduced polycondensation time, creates a product of suitable inherent viscosity without solid stating, and produces a solid product exhibiting reduced acetaldehyde content and reduced acetaldehyde generation upon melting.

The amine component of the amine salts of a phosphorus-containing acid can be chosen from all organic amines capable of salt formation, i.e. primary, secondary, and tertiary organic amines. The amines may be cyclic or acyclic, may be monomeric, oligomeric, or polymeric, and should be selected so as to minimize haze and/or solubility when the latter are issues. The organic constituents of the amine may in principle be any organic group. Organic groups which bear toxicologically suspect groups, or which decompose into toxic substances are generally undesirable. Groups which generate odiferous substances upon heating, or which cause excessive coloration, are also generally not desirable. Ammonia and related compounds like ammonium hydroxide are also suitable for use in the invention. When used in Ti-catalyzed polyesters containing —$OCH_2CH_2O$— in the repeat unit, some salts are more effective than others in terms of the % reduction in AA generation upon melting relative to a control (no additive). The selection of a salt and its amount for a given application depends on the required % reduction in AA generation upon melting. In general, the selected salt is the least expensive one that will give the required % reduction in AA generation upon melting, and the amount of salt is the lowest that will give the desired % reduction in AA generation upon melting. If reduced AA content rather than AA generation is the requirement, selection proceeds in an analogous manner.

Suitable organic groups on the amine include linear and branched alkyl, cycloalkyl, aryl, aralkyl, alkaryl, heteroaryl, etc. Each of these types of organic groups may be substituted or unsubstituted, i.e. with hydroxy, carboxy, alkoxy, halo, and like groups. The organic groups may also contain carbonate, keto, ether, and thioether linkages, as well as amide, ester, sulfoxide, sulfone, epoxy, and the like. This list is illustrative and not limiting.

Preferred amines are cyclic amines having a 5 to 7 membered ring, preferably a six membered ring. These rings may constitute a single "monomeric" species, or may be part of a larger oligomer or polymer.

Preferred cyclic amines are hindered amines which have organic groups substituted at ring positions adjacent to the ring nitrogen. The ring nitrogen itself may also be substituted, i.e. by alkyl, aryl, aralkyl, alkaryl, and other groups. The hindered amines may also comprise a portion of an oligomeric moiety or polymeric moiety.

Another type of preferred amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, i.e., without VOC's (volatile organic compounds).

The carboxylic acid group of the amino acid opens up the possibility that the compound might be reacted into the polyester chain. Reaction into the polyester chain should result in less volatility and less extractability. Reaction into the polyester chain can also be accomplished if the organic portion of the salt contains a hydroxyl and/or a carboxyl group. If there is only 1 carboxyl or hydroxyl group, the salt could function as an end-capper. If there are a total of 2 reactive groups (carboxyl or hydroxyl), the salt may not always be at the end of the chain.

The addition point of the phosphorous salt is desirably late in the melt-phase polymerization process. The late addition of the phosphorus salt occurs when the It.V. of the polymer is at least 0.45 dL/g. As the It.V. target of the product increases, the It.V. of the polymer when the salt is added also increases due to rate concerns. Various more specific embodiments include adding the salt:

a. at a location near the end of the finishing reactor or after the finishing reactor and before the cutter;

b. after the It.V. of the polymer has risen to 0.5 dL/g, or to 0.6 dL/g, or to 0.68 dL/g, or to 0.72 dl/g, or to 0.76 dl/g, or to 0.80 dL/g c. following at least 75% of the polycondensation time, or at least 80%, or at least 90%, or even at least 95%, of the polycondensation time. The polycondensation time is the total time starting from initiating polycondensation to the point in time at which polycondensation is terminated or when the desired It.V. is obtained. For purposes of measuring time in this embodiment, when vacuum is released and the polymer melt exits the final reactor, the final It.V. is obtained even though it is recognized that a very minor It.V. lift or break may occur between the final reactor and cutter;

d. to the polyester melt in the melt phase process at a point within 0.03 dl/g, or within 0.015 dL/g, of the final It.V. exiting the melt phase process; or e. at a point within 10 minutes of less of solidifying the melt.

Satisfying any of the conditions of these embodiments is deemed to also satisfy the condition that the amine salt is added at a point when the It.V. of the polymer melt is at least 0.45 dL/g.

If the additive is added too early in the polymerization process, as defined by the ItV of the polymer, it may be more difficult or impossible to reach a high target ItV in a reasonable process time. Thus, as stated earlier, the additive is incorporated at a late stage in the polycondensation, preferably in the finisher or just prior to pelletization or other means of solidification from the melt to reduce the AA content in the formed solids.

The precursor to the phosphorous moiety of the phosphorus salt may be any oxyphosphorus acid, including but not limited to hypophosphorous acid, phosphorous acid, phosphoric acid, polyphosophoric acid, polyphosphorous acids, pyrophosphoric acid, phosphinic acids, phosphonic acids, phosphate monoesters, phosphate diesters, phosphonate monoesters, pyrophosphate monoesters, pyrophosphate diesters, pyrophosphate triesters, or salts or compounds which still bear at least one acid hydrogen, etc. The hydrogen on any OH group bound directly to the P=O group is acidic. Compounds with more than one acidic hydrogen may have one or more acidic hydrogens substituted with organic groups such as alkyl, aryl, aralkyl, alkaryl, etc., by polyether oligomers, polyester oligomers, etc. At least one salt-forming acidic hydrogen must remain, however. Oxyphosphorus acids with one or more hydrogen bound directly to the P=O group may have one or more of these hydrogens substituted with organic groups such as alkyl, aryl, aralkyl, alkaryl, etc. Examples of these compounds include but are not limited to alkylphosphonic acids, alkylphosphinic acids and dialkylphosphinic acids. As with the amines, the organic groups may be substituted.

The amines must contain at least one nitrogen capable of salt formation with a phosphorus-containing acid. In hindered amines containing N-alkylated piperidinyl moieties, for example, salt formation may involve the piperidinyl nitrogen, generating species such as (but not limited to):

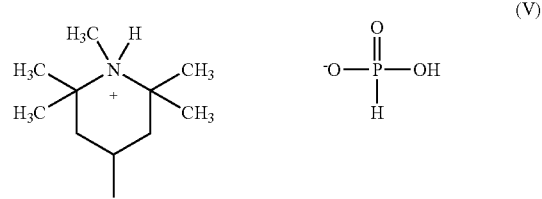

(V)

When there is one nitrogen in the amine compound that can form a salt, one mole of phosphorus-containing acid is used per mole of amine compound. When there are two or more nitrogen atoms in the amine compound that can form salts, two or more moles of acid can be used per mole of amine compound, up to an amount of acid, which creates salts having no remaining neutralizable nitrogen, or slightly in excess of this amount.

The salts are prepared by the reaction of one or more acidic phosphorus-containing compounds with one or more basic organic compounds containing nitrogen, wherein the phosphorus-containing compounds are preferably selected from compounds having the formulas:

(1)

(2)

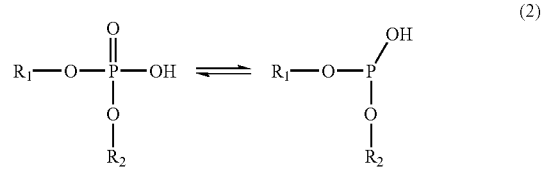

(3)

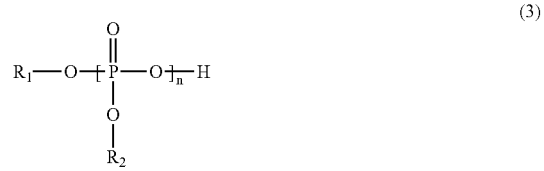

(4)

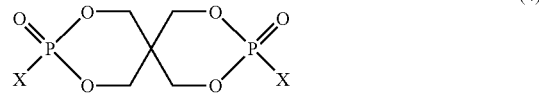

(5)

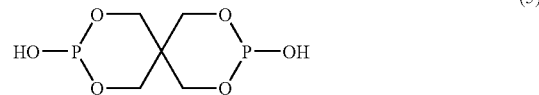

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from hydrogen and hydroxy;

and wherein the basic organic compounds containing nitrogen are selected from compounds having the formulas:

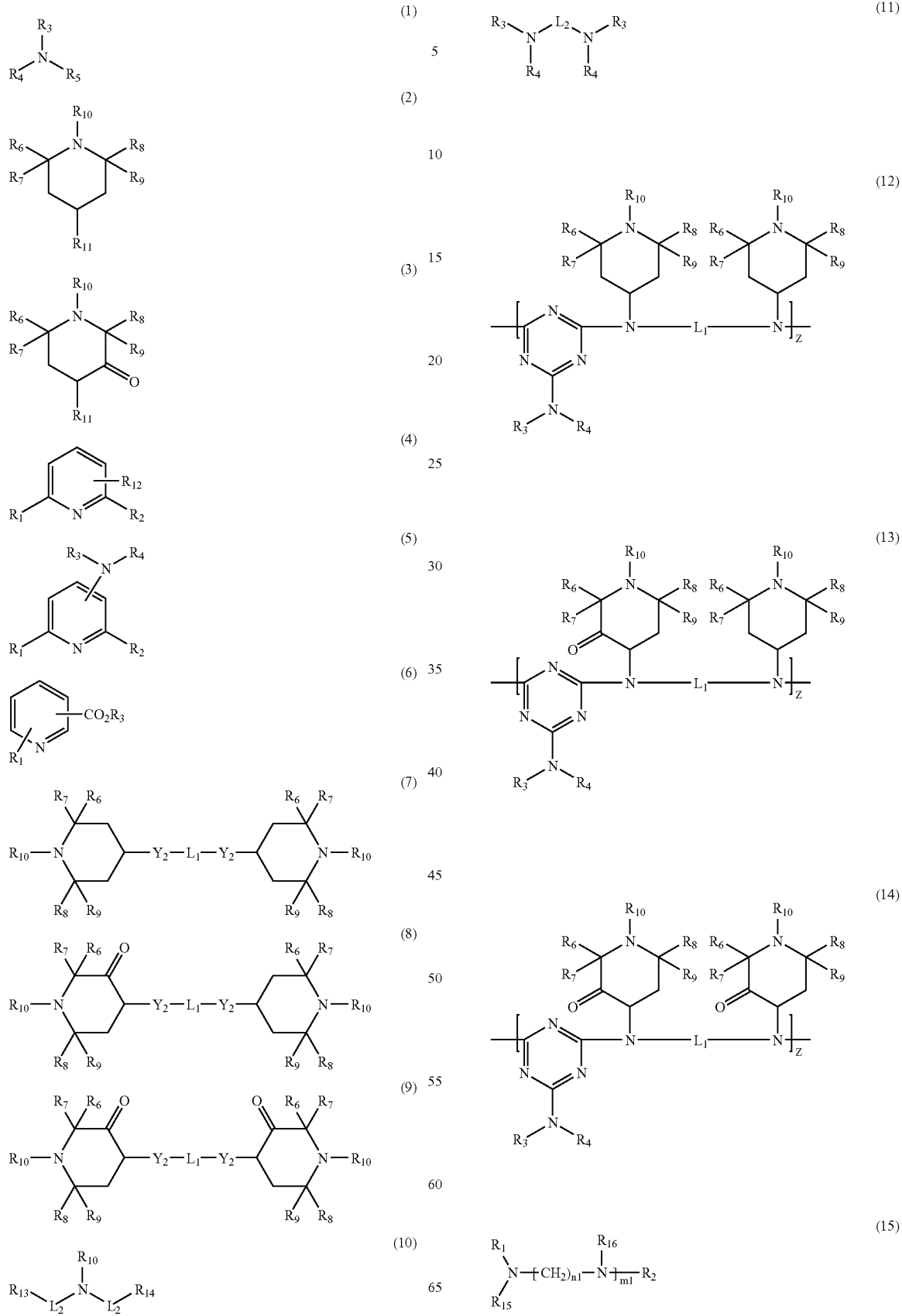

-continued

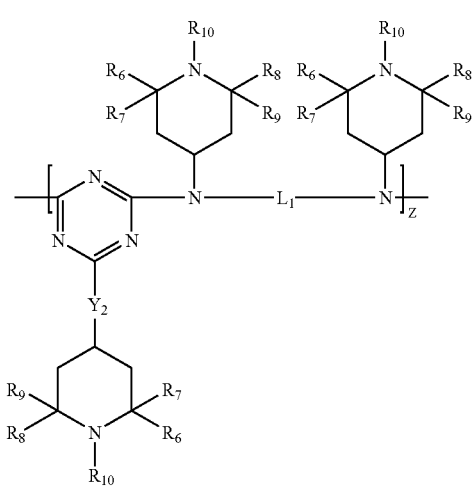
(16)

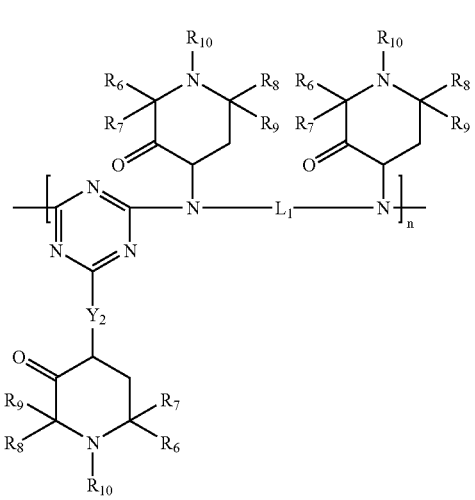
(19)

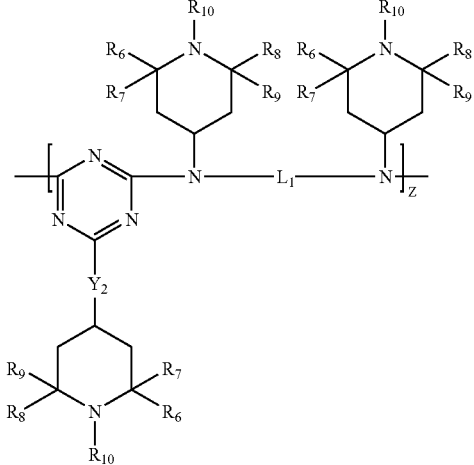
(17)

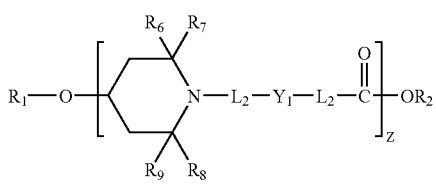
(20)

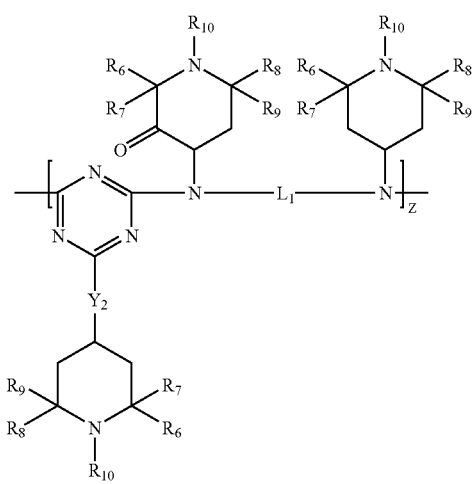
(18)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

Each of the following types of organic groups may be substituted or unsubstituted, i.e. with hydroxy, carboxy, alkoxy, halo, and/or like groups, and any combination thereof. The organic groups may also contain carbonate, keto, ether, and thioether linkages, as well as amide, ester, sulfoxide, sulfone, epoxy, and the like. This list is illustrative and not limiting.

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein preferably, at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

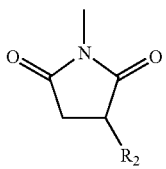

wherein $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 3 4 or 5 positions on the aromatic ring;

the —N($R_3$)($R_4$) group may be located at the 3, 4 or 5 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —(CH$_2$CH$_2$—Y$_1$)$_{1-3}$—CH$_2$CH$_2$—; $C_3$-$C_8$-cycloalkylene; arylene; or —CO-$L_2$-OC—;

$L_2$ is selected from $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from —OC(O)—, —NHC(O)—, —O—, —S—, —N($R_1$)—;

$Y_2$ is selected from —O— or —N($R_1$)—;

$R_{13}$ and $R_{14}$ are independently selected from —O—$R_2$, and —N($R_2$)$_2$;

Z is a positive integer of up to about 20, preferably up to about 6;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

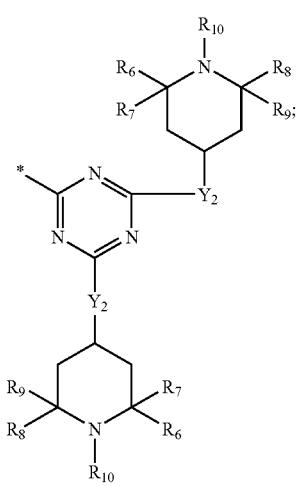

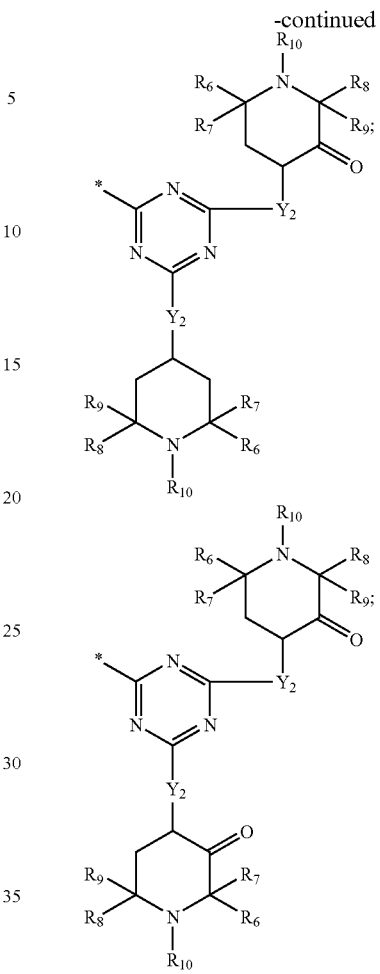

Radical A structures wherein * designates the position of attachment.

Preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, carboxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, carboxy, halogen, and the like.

The term "aryl" is used to denote an aromatic radical containing 6, 10 or 14 carbon atoms in the conjugated aromatic ring structure and these radicals are optionally substituted with one or more groups selected from $C_1$-$C_6$-alkyl; $C_1$-$C_6$- alkoxy; phenyl, and phenyl substituted with $C_1$-$C_6$-alkyl; $C_1$-$C_6$-alkoxy; $C_3$-$C_8$-cycloalkyl; halogen; hydroxy, carboxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, carboxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, carboxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$— alkyl, $C_1$-$C_6$-alkoxy and halogen.

Preferred hindered amines contain alkyl-substituted piperidinyl moieties and/or triazine moieties, more preferably hindered amines where at least one amine group is substituted by both a triazine moiety and an alkyl-substituted piperidine moiety. In the most preferred hindered amines, amino group-containing moieties are linked by an alkylene group, preferably a (—CH$_2$—)$_n$ group where n is from 2 to 12, preferably from 4-10, and most preferably 6 or 8.

The most preferred hindered amine is Cyasorb® UV-3529, containing repeat units of the formula:

(21)

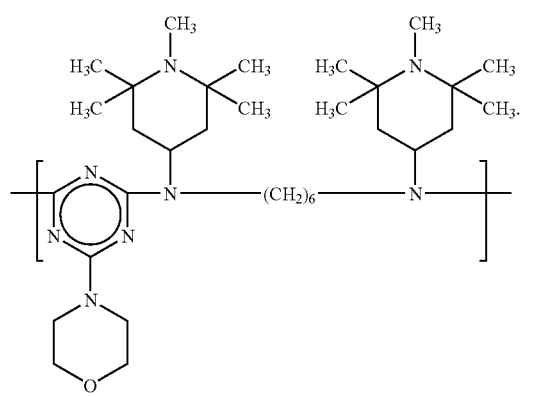

The salt of the amine component of the novel compositions provided by the present invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in appropriate solvents and the solutions mixed followed by precipitation of the reaction product; mixing the phosphorus-containing acid and the basic organic compound without solvent; and the like.

The ratio of the number of acidic oxyphosphorus groups in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during polyester manufacture, concentrate manufacture (if any) or preform manufacture.

The salt or salts typically are present in concentrations ranging from about 0.0001 to about 0.25 weight percent based on the weight of the polyester.

The acidic phosphorus-containing compounds preferably are phosphorous acid, phosphoric acid and polyphosphoric acid, most preferably phosphorous acid and phosphoric acid.

Examples of suitable basic organic compounds containing nitrogen include amino acids, ammonium salts and alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 90751-07-8), Cyasorb UV-3529 (Cytec Industries, CAS# 193098-40-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 106990-43-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061 (Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizers may be listed in the *Plastic Additives Handbook 5th Edition* (Hanser Gardner Publications, Inc., Cincinnati, Ohio, USA, 2001).

The hindered amine light stabilizers having above formulas (2), (3), (7), (8), (9), (12), (13), (14), (15), (16), (17), (18), (19) and (20), and especially (21), represent the preferred basic compounds. Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) and any equivalents thereof are specific examples of the preferred basic compounds. A more preferred groups of the basic nitrogen compounds are the hindered amine light stabilizers having above formulas (2), (3), (7), (8), (9), (12), (13), (14), (15), (16), (17), (18) and (19) wherein radical $R^{10}$ is hydrogen or C1-C22 alkyl and formula (15) wherein at least one of $R^{15}$ and $R^{16}$ represents radical A wherein $R^{10}$ is hydrogen or C1-C22 alkyl. The most preferred are high molecular weight HALS wherein the molecular weight is greater than about 1000 such as Cyasorb UV-3529 (Cytec Industries, CAS# 193098-40-7). The most preferred HALS correspond to formula (12) set forth above wherein $R^6=R^7=R^8=R^9=R^{10}$=methyl, $(R^3)(R^4)$N— collectively represent morpholino, $L_1$ is $C_1$ to $C_6$ alkylene, and Z is 1 to 6. Additionally, the hindered amine light stabilizers having above formulas (12), (13), (14), (15), (16), (17), (18) and (19) wherein radical $R^{10}$ is hydrogen or C1-C22 alkyl and formula (15) wherein at least one of $R^{15}$ and $R^{16}$ represents radical A wherein $R^{10}$ is hydrogen or C1-C22 alkyl are particularly preferred as the basic organic component of a salt with an oxyphosphorus acid, which can be used to lower residual AA in pellets and/or AA generation upon melting for polyester compositions containing —OCH$_2$CH$_2$O— in a repeat unit.

Examples of suitable amines include ammonia and its salts, alkyl and cycloalkyl amines such as methylamine, ethyl amine, n-propylamine, i-propylamine butylamine, n-hexylamine, 2-ethylhexylamine, dimethylamine, diethylamine, di(n-propyl)amine, di(i-propyl)amine, di-(n-hexyl)amine, di(n-octyl)amine, cyclopentylamine, dicyclopentylamine, cyclohexylamine, dicyclohexylamine, cycloheptylamine, cyclooctylamine, adamantane amine, trimethylamine, triethylamine, tri(n-butyl)amine, ethylene diamine, 1,3-propylenediamine, triethylenediamine, and polyalkylenepolyamines in general, diethanolamine, dipropanolamine, triethanolamine, tripropanolamine, fatty amines, di(fatty) amines, and the like.

Hetrocyclic amines include piperine, piperidine, morpholine, aminopyridine, and in particular, heterocyclic, non-aromatic amines substituted in one or more ring positions adjacent to the ring nitrogen, for example 2,6-dimethylpiperidine, 2-methyl-6-ethylpiperidine, 2,6-di(isopropyl)piperidine, 2,2,6,6-tetramethyl piperidine, and the like. The same types of substitution patterns are useful with other cyclic amines. The substituent and substituent patterns are illustrative and not limiting.

In general, it is preferred that the amines used be of relatively high vapor pressure, and thus it is not preferred to employ low molecular weight alkylamines such as methylamine, dimethylamine, ethylamine, and the like, since they may be lost due to volatility when the position of the equilibrium results in the unsalted form and/or these might pose a migration problem. Low molecular weight alkylamines that are substituted with carboxy and/or hydroxyl functionality (ies), which may react into the polyester chain, are preferred. Amino acids are examples of this class of compounds. The inner salt nature of amino acids results in high melting/decomposition points and, in some cases, gives some solubility in water, which eliminates volatile organic compounds (VOC) during the salt synthesis.

By utilizing the process of the present invention, polymers with suitably high It.V. may be obtained in relatively short overall process times, and produce polyester product, for example in the form of pellets, which not only do not require the expense and increased process time of solid stating, but also contain less AA and generate less AA during future processing. If yet higher It.V. polymers are desired, the molecular weight may be increased further by solid stating. While this additional process step does involve extra time and expense, this is partially compensated by reduction in overall polymerization time in the melt phase. Moreover, solid stating will further reduce the AA content. Immediately following the finishing reactor and before pelletization, the amine salts of the invention may be added to molten polyester and blended with a static mixer or any effective mixing apparatus. Alternatively, the amine salts may be added near the end of the finisher reactor. In either case, the amine salts may be added neat (without dilution), in a slip stream of molten polyester, as a master batch in polyester pellets, i.e. a concentrate, or in a liquid carrier. The polyesters according to the present invention can be used in forming a variety of articles including sheets, films, tubing, profiles, preforms, fibers, woven and shaped articles, such as containers, and thermoformed articles such as trays and the like.

Having generally described this invention, a further understanding can be obtained by reference to certain specific examples which are provided herein for purposes of illustration only and are not intended to be limiting unless otherwise specified.

EXAMPLES

Free acetaldehyde content in the polymer following addition of the respective additives is assessed as follows. Following the end of the array or lab preparation, the polymer is cooled for about 15 min., separated from the glass flask, cooled for about 10 min. and then placed immediately into liquid nitrogen. The polymer is ground cryogenically to pass a 3 mm screen. The residual or free AA sample is kept frozen.

For preforms, it is sufficient to use ASTM # F2013-00 described below. Since the polymer is melted in an extruder prior to injection molding, there is an opportunity for any AA precursors to be converted to AA. When experimental PET samples are prepared in the laboratory, there is usually not enough material to mold performs to test AA. Experimental PET samples prepared in the laboratory are in the form of pellets or powders (most common). In the case of PET pellets or powders, there has been no melting after the manufacturing; therefore to give the samples a melt heat history, pellets or powders are melted during the AA generation test described below prior to testing free AA by ASTM # F2013-00. The AA level from ASTM # F2013-00 on preforms cannot be compared directly to the AA level from the AA generation test on pellets or powders; however, two methods are correlated, and similar trends should be seen in each test. A commercial polyester sold to make carbonated soft drink ("CSD") bottles (CB-12) is submitted every time the AA generation test is done on experimental samples. The AA level in preforms made from commercial pellet samples is usually well known at typical processing conditions and considered acceptable for CSD applications. The AA generation results on the commercial polyester are considered as a benchmark: AA generation rates less than or equal to the AA generation value of the commercial pellets should indicate an acceptable level of preform AA for CSD applications at the time that the testing was done. The water bottle market can necessitate lower AA generation rates than those acceptable in the CSD bottle market.

The acetaldehyde generation rate can be measured on the solid particles and the free AA can be measured on solid particles or preforms. The following method is used to measure acetaldehyde generation on solid particles.

The method used to determine the level of free AA in the polyester polymer composition is the test method ASTM # F2013-00. This test method is used to measure the level of free acetaldehyde in particles, powders, preforms, bottles, and any other form the polyester polymer composition may take. For purposes of measuring residual or free acetaldehyde, the sample is tested according to the method described below. However, for purposes of measuring the acetaldehyde generation, the sample has to undergo a second melt history in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM # F2013-00 test method for analysis.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 µm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

To obtain the acetaldehyde generation rate, the ASTM # F2013-00 test method as described above is also used, except that prior to testing the sample by the ASTM # F2013-00 test method, it undergoes a melt history in addition to the previous melt phase polycondensation. For measuring the acetaldehyde generation rate on preforms, it is sufficient to use this ASTM # F2013-00 Method as described above without subjecting the preforms to a further melt history since by virtue of making a preform, the pellets are melted in an extruder prior to injection molding. By melt extruding or injection molding, AA precursors in the polymer melt have the opportunity to covert to acetaldehyde. In the event that the sample is a particle or a powder which has not seen a subsequent melt history, the sample is prepared according the Sample Preparation method, and then submitted to the ASTM # F2013-00 test. Sample Preparation: For the purpose of measuring the acetaldehyde generation rate, and if the sample has not seen a melt history subsequent to melt phase polycondensation, it is prepared according to this method prior to submitting the sample to the ASTM # F2013-00 test. Samples of polymer powder ground to pass a 3 mm screen are heated in an oven at 115° C. under vacuum (25-30 in. Hg) with a 4 SCFH nitrogen purge for at least 48 h. Although overnight drying would be sufficient for water removal alone, this extended oven treatment also serves to desorb to about 1 ppm or less the residual AA present in the high IV powder after melt-phase-only synthesis and prior to AA generation testing. It would take longer to desorb residual AA from pellets to about 1 ppm or less, due to the larger particle size (longer diffusion path). Any suitable acetaldehyde devolatization technique can be employed on pellets which reduces the level of free acetaldehyde down to about 1 ppm or less, including passing hot inert gas over the pellets for a time period sufficient to reduce the residual acetaldehyde to the desired level. The acetaldehyde devolatization temperature should not exceed 170° C. The sample is then packed in a preheated Tinius Olsen extrusion plastometer using a steel rod. The orifice die is calibrated according to ASTM D 1238. A small amount of material is purged out the bottom, which is then plugged. The piston rod assembly is put in the top of the barrel. A 225 g weight may be placed on top of the piston rod to hold the rod down inside of the barrel. The polymer is held at 295° C. for 5 min. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM # F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample, is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument. The automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but is not automated.

Acetaldehyde can be generated in the above manner over a temperature range of 265° C. to 305° C. The most consistent results are obtained between 285° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process making it ideal for testing laboratory samples.

Other polymer parameters may be measured by standard methods.

The measurements of L*, a* and b* color values are conducted on polyester polymers ground to a powder passing a 3 mm screen. Color measurements were performed in reflectance (specular included) using a HunterLab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer is standardized regularly and UV control was employed and maintained in calibration following the HunterLab recommendations. An optional glass port plate is installed at the reflectance port to minimize contamination of the sphere. Powders are placed in an optical glass cell. The optical-grade glass is recessed from the front of the cell by 0.062" and the glass itself is 0.092" thick. The sample area is 0.71" deep, 1.92" wide, 2.35" tall. The powders are allowed to settle by vibrating the sample for 20 seconds using a laboratory Mini-Vortexer (VWR International, West Chester, Pa.). The glass cell is maintained flush against the reflectance port and covered with a black opaque cover. A single cell packing is evaluated and the cell is removed and replaced for three replicate measurements for each sample. The reported value should be the average of the triplicates.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. The viscosity of the polymer solutions is determined using a Viscotek Modified Differential Viscometer. A description of the operating principle of the differential viscometers can be found in ASTM D 5225. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight ln=Natural logarithm $t_s$=Sample flow time through a capillary tube $t_o$=Solvent-blank flow time through a capillary tube C=Concentration of polymer in grams per 100 mL of solvent (0.50%)

The intrinsic viscosity is the limiting value at infinite dilution of the specific viscosity of a polymer. It is defined by the following equation:

$$\eta_{int}=lim(\eta_{sp}/C)=lim(\ln \eta_r)/C$$

C→0 C→0 where $\eta_{int}$=Intrinsic viscosity $\eta_r$=Relative viscosity=$t_s/t_o$ $\eta_{sp}$=Specific viscosity=$\eta_r$−1

Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The uncorrected inherent viscosity ($\eta_{inh}$) of each sample is calculated from the Viscotek Model Y501 Relative Viscometer using the following equation:

$$\eta_{inh}=[\ln(P_2/KP_1)]/C$$

where $P_2$=The pressure in capillary $P_2$ $P_1$=The pressure in capillary $P_1$ ln=Natural logarithm K=Viscosity constant obtained from baseline reading C=Concentration of polymer in grams per 100 mL of solvent The corrected Ih.V., based on calibration with standard reference materials, is calculated as follows:

Corrected Ih.V.=Calculated Ih.V.×Calibration Factor

The intrinsic viscosity (It.V. or $\eta_{int}$) may be estimated using the Billmeyer equation as follows:

$$\eta_{int}=0.5[e^{0.5\times Corrected\ Ih.V.}-1]+(0.75\times Corrected\ Ih.V.)$$

The reference for estimating intrinsic viscosity (Billmeyer relationship) is J. *Polymer Sci.*, 4, pp. 83-86 (1949).

Comparative Example A

A sample of PET oligomer prepared from terephthalic acid and ethylene glycol, and also containing about 1.5 mole percent of about 35% cis/65% trans 1,4-cyclohexanedimethanol was employed in the polycondensation. The oligomer also contains about 1.2 weight percent of diethylene glycol, which was generated during esterification. This oligomer has about 95% conversion of acid groups via NMR/titration of acid groups, a $M_n$ of about 766 g/mole, and a $M_w$ of 1478 g/mole.

For polycondensation, ground oligomer (103 g) is weighed into a half-liter, single-necked, round-bottomed flask. The catalyst employed is titanium tetrabutoxide and it is added to the flask. A 316 L stainless steel paddle stirrer and glass polymer head were attached to the flask. After attaching the polymer head to a side arm and a purge hose, two nitrogen purges are completed. The polymerization reactor is operated under control of a CAMILE™ automation system, programmed to implement the following array (Table 1).

TABLE 1

| Stage | Time (minutes) | Temperature C.° | Vacuum (torr) | Stir Speed (rpm) | Power (kg-cm) | Flags |
|---|---|---|---|---|---|---|
| 1 | 0.1 | 270 | 730 | 0 | | |
| 2 | 10 | 270 | 730 | 150* | | |
| 3 | 2 | 270 | 140* | 300* | | |
| 4 | 1 | 270 | 140 | 300 | | Calibrate |
| 5 | 10 | 270 | 25* | 300 | | |
| 6 | 10 | 270 | 25 | 300 | | |
| 7 | 1 | 270 | 140* | 300 | | |
| 8 | 2 | 270 | 140 | 300 | | Catalyst(P) |
| 9 | 1 | 270 | 25* | 300 | | |
| 10 | 10 | 270 | 25 | 300 | | |
| 11 | 2 | 270 | 2* | 30* | | |
| 12 | 1 | 270 | 0.5* | 30 | | Vacuum |
| 13 | 500# | 270 | 0.5 | 30 | target | Power |

*= ramp;
= torque termination
when temperature = 300° C., change all 270 to 300 (same for 285).

A molten bath of Belmont metal is raised to surround the flask, and the CAMILE™ array is implemented. In this array, a "ramp" is defined as a linear change of vacuum, temperature, or stir speed during the specified stage time. The stirring system is automatically calibrated between stages 4 and 5. After stage 6 ends, the vacuum level was ramped up to 140 torr, and then a 2 minute phosphorus addition stage (stage 8) begins. A phosphorus compound (not the amine salt of the present invention) is only added to the Sb controls. The finisher stage (13) is terminated when the stirrer torque is such that it reaches the target (predetermined for a given temperature and polymer rig) three times. The finisher stage time is referred to as "Time to IV." Following the end of the array or lab preparation, the polymer is cooled for about 15 min., separated from the glass flask, cooled for about 10 min. and then placed immediately into liquid nitrogen. The polymer is ground cryogenically to pass a 3 mm screen. The residual or free AA sample is kept frozen.

The ground polymer is analyzed for acetaldehyde generation rate (AAGen), inherent viscosity, L*, a*, and b* color. The data can be seen in Table 2. The contour plot of FIG. 1 indicates the acetaldehyde generation rate (at 295° C. for 5 minutes) for different combinations of titanium levels and polycondensation temperatures at a vacuum level of 1.1 torr. The average AAGen of commercial PET pellets at the same time was 25.5 ppm. None of these are subject invention Examples; all are Comparative examples.

TABLE 2

| Ex. | Ti ppm | Temp deg C. | Vac. torr | Time to IV (min) | IhV dL/g | AA Gen 295/5 ppm | L* Color CIELAB | a* Color CIELAB | b* Color CIELAB |
|---|---|---|---|---|---|---|---|---|---|
| Control[1] | | 285 | 1.1 | 103.32 | 0.805 | 29.35 | 78.45 | −1.99 | 3.00 |
| C1 | 10 | 285 | 1.1 | 45.38 | 0.796 | 37.565 | 81.85 | −1.06 | 11.18 |
| C2 | 15 | 270 | 2 | 158.97 | 0.803 | 41.255 | 81.40 | −1.36 | 12.48 |
| C3 | 10 | 285 | 1.1 | 57.12 | 0.838 | 38.93 | 78.73 | −0.80 | 12.32 |
| C4 | 15 | 300 | 0.2 | 9.47 | 0.791 | 40.805 | 82.34 | −1.52 | 14.15 |
| C5 | 5 | 270 | 0.2 | 123.64 | 0.795 | 28.34 | 78.59 | −0.41 | 8.65 |
| C6 | 5 | 300 | 2 | 54.77 | 0.831 | 38.52 | 81.73 | −1.31 | 13.04 |
| C7 | 10 | 285 | 1.1 | 56.5 | 0.829 | 39.93 | 82.08 | −1.11 | 13.38 |
| Control | | 285 | 1.1 | 91.46 | 0.771 | 34.405 | 76.73 | −1.07 | 2.65 |
| Control | | 285 | 1.1 | 93.04 | 0.789 | 30.97 | 79.47 | −1.95 | 2.61 |
| C8 | 5 | 270 | 2 | 223.17 | 0.781 | 23.96 | 81.13 | −0.69 | 10.58 |
| C9 | 5 | 300 | 0.2 | 30.08 | 0.805 | 38.465 | 82.32 | −1.37 | 10.55 |
| C10 | 15 | 270 | 0.2 | 51.43 | 0.766 | 40.72 | 79.49 | −0.34 | 10.44 |
| C11 | 15 | 300 | 2 | 16.22 | 0.771 | 46.15 | 78.61 | −0.31 | 14.00 |
| C12 | 10 | 285 | 1.1 | 49.39 | 0.834 | 28.13 | 81.36 | −0.21 | 12.06 |
| Control | | 285 | 1.1 | 106.01 | 0.807 | 32.415 | 78.37 | −0.85 | 5.66 |
| C13 | 10 | 285 | 1.1 | 43.4 | 0.792 | 38.005 | 78.23 | −0.12 | 10.81 |
| C14 | 10 | 285 | 1.1 | 51.92 | 0.852 | 28.21 | 78.43 | −0.17 | 10.89 |

Example A

To make the phosphorous acid salts of CyasorbUV 3529, two moles of phosphorous acid were used per mole of CyasorbUV 3529, and reacted per the following procedure. The salts can be manufactured according to the description in per copending U.S. application Ser. No. 10/39,2575), which is fully incorporated herein by reference To a 5-L, round-bottomed flask equipped with a mechanical stirrer, thermocouple, and a heating mantle is added 411.76 g of Cyasorb UV-3529 and 945 g of toluene. Cyasorb UV-3529 is a polymeric hindered amine light stabilizer believed to conform generally to the compounds of amine formula (12) set forth above $R_6=R_7=R_8=R_9=R_{10}$=methyl; $L_1$ is hexamethylene; and $(R_3)(R_4)N$— collectively represent a morpholino group. The slurry is heated to 60° C. and stirred until a homogeneous solution was obtained. Isopropyl alcohol (370 g) is added to the reaction vessel. A solution of 115.46 g (1.41 mol) of phosphorous acid dissolved into 370 g of isopropyl alcohol is added in a small steady stream (fast dropwise) via an addition funnel to the Cyasorb UV-3529 solution with rapid stirring over approximately 30 minutes. A homogeneous solution is obtained and stirred for 15 min once the addition is complete. The reaction mixture was pumped at about 5 mL/min into a 12 L reaction vessel that contained about 7 L of rapidly stirred heptane (4768 g) over a period of approximately 50 minutes. The feed rate of the reaction mixture into the heptane-containing vessel has some affect on the particle size of the final product. Slow feeds tend to produce a finer powder while higher feed rates will results in a larger particle that almost appears to be agglomerated. This needs to be balanced by the tendency for the salt to get sticky in the drowning vessel if the feed rate is too rapid. After addition was complete, the resulting slurry was stirred for about 60 minutes. The precipitate was collected by suction filtration. The filter cake was washed twice with 137 g of heptane and then sucked dry on the filter paper overnight. The solid was placed in a metal pan and dried overnight in a vacuum oven at 50° C. with a slight ingress of dry nitrogen. The dry product weighed approximately 531.8 g (101% of theory). Typical bulk density of the dry salt has been between 0.4 and 0.6 g/mL.

To test the phosphorous acid salts of Cyasorb UV3529, melt blending in a glass flask achieves a uniform distribution of additive within the polymer simulating the mixing of an additive near the end of or after the final polycondensation reactor. The polyester powders prepared above are weighed into 500 mL round bottom flasks. The powders are dried at 120° C. under full vacuum overnight (about 16 hours) in a vacuum oven. After cooling the flask to about room temperature in a desiccator (about 1.5 hours), the additive is weighed into the flask. The additive was targeted at the 0.1 wt. % level. The blending parameters are set forth in Table 3.

For mixing the amine salts with the polymers of Table 2, a polymer head with stirrer is attached and the flask purged twice with nitrogen. The CAMILE™ automation system is programmed for the following array, as set forth in Table 3.

TABLE 3

| Stage | Time Min. | Temp. ° C. | Vac Torr | Stir RPM | Power kg-cm | Estimated End Time |
|---|---|---|---|---|---|---|
| 1 | .1 | 270 | 730 | 0 | 0 | 10:23:59 |
| 2 | 5 | 270 | 730 | 0 | 0 | 10:28:59 |
| 3 | 5 | 270 | 730 | 0 | 0 | 10:33:59 |
| 4 | 5 | 270 | 730 | 15* | 0 | 10:38:59 |
| 5 | 4 | 270 | 730 | 35* | 0 | 10:42:59 |
| 6 | 2 | 270 | 730 | 75* | 0 | 10:44:59 |
| 7 | 5 | 270 | 730 | 75 | 0 | 10:49:59 |

*= ramp

A moderate nitrogen purge was employed at all times. During Stages 2 and 3, the stirrer is turned slowly by hand. Following the end of the array, the polymer is cooled, chopped, and ground to pass a 3 mm screen. The ground polymer is analyzed for acetaldehyde generation rate, inherent viscosity, L*, a*, and b* color. Inherent viscosity is measured at 25° C. on a 0.50 g sample dissolved in 100 mL of 60% by weight phenol and 40% by weight 1,1,2,2-tetrachloroethane. The results are presented in Table 4

TABLE 4

| Ex. | Ti ppm | Temp deg C. | Vac torr | IV after Blend dL/g | Polymer Wt. in Blend (g) | Additive (g) | P after Blend ppm | L* after Blend | a* after Blend | b* after Blend |
|---|---|---|---|---|---|---|---|---|---|---|
| 1 | 10 | 285 | 1.1 | 0.752 | 45 | 0.048 | 44 | 80.68 | −0.77 | 10.57 |
| 2 | 15 | 270 | 2 | 0.761 | 45 | 0.047 | 54 | 80.63 | −0.82 | 11.05 |
| 3 | 10 | 285 | 1.1 | 0.797 | 45 | 0.045 | 47 | 78.78 | −0.49 | 11.65 |
| 4 | 15 | 300 | 0.2 | 0.718 | 45 | 0.045 | 54 | 80.24 | −1.26 | 13.12 |
| 5 | 5 | 270 | 0.2 | 0.785 | 32.07 | 0.032 |  | 79.61 | −0.85 | 8.96 |
| 6 | 5 | 300 | 2 | 0.778 | 45 | 0.045 | 52 | 79.41 | −1.02 | 13.26 |
| 7 | 10 | 285 | 1.1 | 0.773 | 45 | 0.046 | 51 | 79.58 | −0.85 | 12.00 |
| 8 | 5 | 270 | 2 | 0.735 | 45 | 0.045 | 52 | 80.69 | −0.43 | 9.98 |
| 9 | 5 | 300 | 0.2 | 0.779 | 44.93 | 0.045 | 46 | 79.83 | −1.24 | 10.97 |
| 10 | 15 | 270 | 0.2 | 0.721 | 45 | 0.044 | 51 | 79.29 | −0.31 | 8.77 |
| 11 | 15 | 300 | 2 | 0.76 | 45 | 0.045 | 52 | 78.81 | −0.73 | 12.92 |
| 12 | 10 | 285 | 1.1 | 0.78 | 45 | 0.046 | 50 | 81.07 | −0.83 | 11.23 |
| 13 | 10 | 285 | 1.1 | 0.769 | 45 | 0.046 | 47 | 78.57 | −0.53 | 10.72 |
| 14 | 10 | 285 | 1.1 | 0.804 | 45 | 0.045 | 48 | 78.49 | −0.58 | 10.66 |

Figure 2:
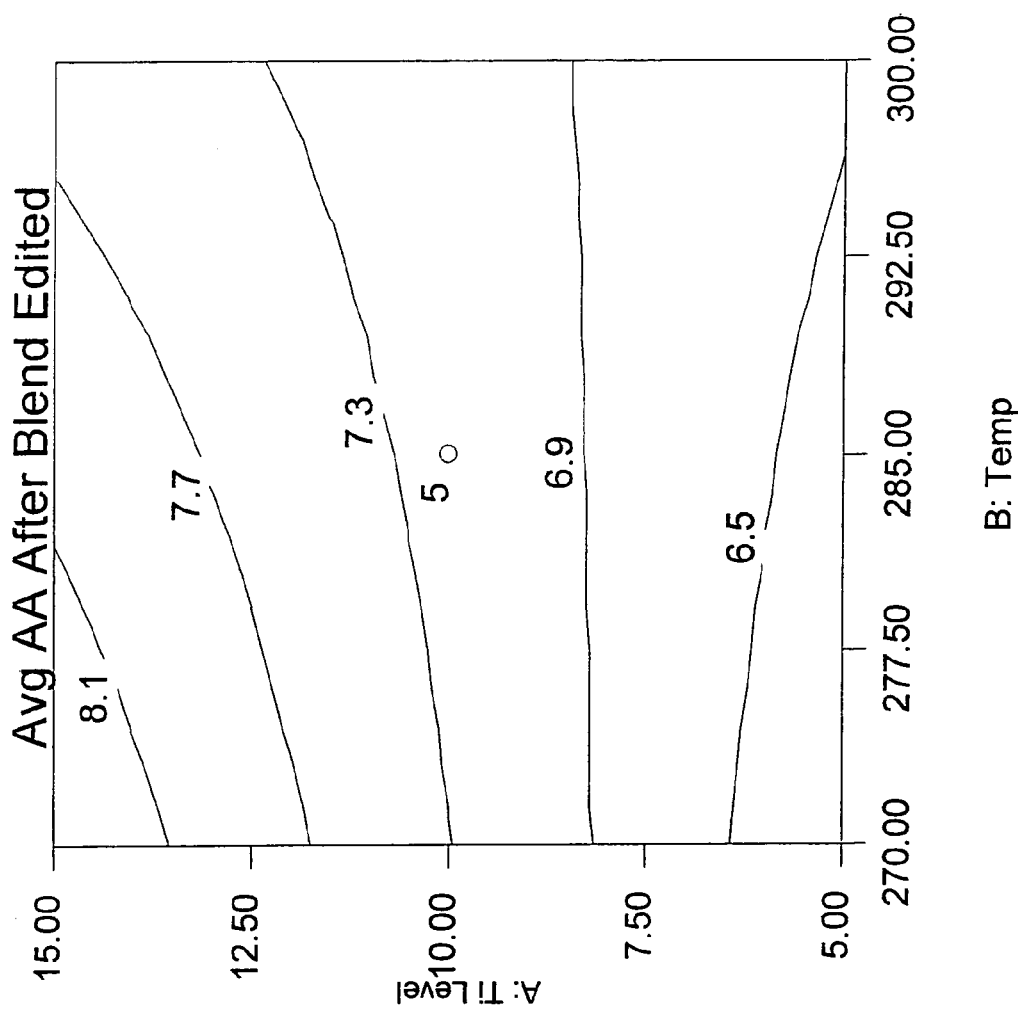
FIG. 2 is a contour plot similar to FIG. 1, but with 0.1 wt % of acetaldehyde-reducing additive.

The contour plot of FIG. 2 illustrates the AA generation rates at 295° C. after 5 minutes, after blending about 0.1 wt. % of the phosphorous acid salts of Cyasorb UV 3529 into PET made with various Ti levels, temperature and vacuum levels. This contour plot demonstrates the dramatic improvement in AA generation rate with the additive present as compared to the previous contour plot (FIG. 1), which was prior to blending in the additive. Reductions in the AA generation rate ranged from 75 to 83%. These were calculated per the method described in Example B. The average AAGen of commercial PET pellets tested at the same time was 24.8 ppm, much higher than the examples with the additive. The examples with the additive have low enough AA generation rates upon melting to be used in water bottle applications and/or or dual water/CSD applications. A slight improvement in yellowness or b* color was seen with about 0.1 wt. % of the additive present.

Examples B

These examples use the melt-blending procedure outlined in Table 3 for the previous examples, and utilized 100 g of PET modified with about 2.6 mole % isophthalic acid and about 4.2 mole % diethylene glycol. This PET was produced on a production scale line with 10 ppm Ti and 0 ppm P. Examples prefaced with the letter "C" are comparative examples.

The % reduction in AA generation at 295° C. for 5 minutes (AA GEN 295/5) was calculated as follows: 1) an average AAGen for the runs with no additive was calculated to be 35.68 ppm, 2) the AAGen for a given run was divided by 35.68 ppm, 3) the quotient was multiplied by 100, and 4) the product was subtracted from 100. As can be seen from the Table 5, % reduction in AA GEN 295/5 was around 75% for around 55 ppm P from phosphorous acid salts of Cyasorb UV 3529 ("Cyasorb UV 3529-H3PO3"). The average AAGen of production control PET pellets tested at the same time was 23.5 ppm, much higher than the 8.5-9.3 ppm in the examples with an additive of this invention. The average L* color of the blends with phosphorus-containing additives were brighter by about one L* unit than the average of those without the additive. The average a* color of the blends with phosphorus-containing additives were more green by about 0.4a* unit than those without the additive. The average b* color of the blends with phosphorus-containing additives were less yellow by about one b* unit than the average of those without additive. On average, the inherent viscosities dropped moderately (<0.05 dL/g) at the additive levels tested.

Example C

This example uses the melting blending procedure in Table 3 and the polymer described in Example B.

A further series of polymers were prepared, employing the same phosphorous acid salt of CYASORB UV 3529 as used in the previous Example A and Example B. The results are presented in Table 6.

TABLE 5

| Example | Additive | Ti (ppm) | P (ppm) | Amt. Added (9) | IV (dL/g) | AA GEN 295/5 (ppm) | % Reduction In AA GEN | AVG L* | AVG a* | AVG b* |
|---|---|---|---|---|---|---|---|---|---|---|
| C15 | None | 10 | 0 | 0 | 0.797 | 36.285 | −1.7 | 76.49 | −3.18 | 7.82 |
| C16 | None | 13 | 5 | 0 | 0.752 | 33.94 | 4.9 | 75.01 | −3.07 | 7.71 |
| C17 | None | 10 | 2 | 0 | 0.842 | 36.82 | −3.2 | 75.95 | −3.19 | 8.26 |
| 15 | Cyasorb UV 3529-H3PO3 | 12 | 54 | 0.106 | 0.734 | 9.325 | 73.9 | 76.84 | −3.51 | 6.67 |
| 16 | Cyasorb UV 3529-H3PO3 | 10 | 56 | 0.1 | 0.77 | 8.465 | 76.3 | 77.04 | −3.6 | 6.91 |

TABLE 6

| Ex. | Cyasorb UV 3529-H3PO4 Amt g | Ti ppm | P ppm | IV dl/g | Residual AA ppm. | % Reduced Residual AA | AAGEN 295/5 ppm | % Reduced AA Gen | avg L* | avg a* | Avg b* |
|---|---|---|---|---|---|---|---|---|---|---|---|
| 17 | 0 | 10 | 1 | 0.744 | 17.21 | 0.00 | 35.32 | 0.00 | 76.86 | −1.99 | |
| 18 | 0.02 | 10 | 16 | 0.716 | 4.45 | 74.14 | 10.07 | 71.49 | −2.22 | −2.22 | |
| 19 | 0.04 | 10 | 29 | 0.723 | 8.07 | 53.11 | 9.27 | 73.75 | 76.46 | −2.36 | |
| 20 | 0.06 | 10 | 39 | 0.72 | 6.11 | 64.50 | 10.28 | 70.89 | 76.76 | −2.38 | |
| 21 | 0.08 | 10 | 46 | 0.714 | 4.14 | 75.94 | 7.4 | 79.05 | 76.46 | −2.41 | |
| 22 | 0.1 | 10 | 61 | 0.687 | 4.32 | 74.90 | 7.61 | 78.45 | 77.31 | −2.54 | |

TABLE 7

| Example | Additive | Additive Amount (g) | Ti (ppm) | P (ppm) | IV (dl/g) | AA FN (ppm) | AAGEN 295/5 (ppm) | AVG L* Color | AVG a* Color | AVG b* Color |
|---|---|---|---|---|---|---|---|---|---|---|
| 23 | Cyasorb UV 3529-H3PO3 | 0.102 | 10 | 66 | 0.741 | 3.1 | 7.8 | 77 | −2.62 | 7.27 |

TABLE 7-continued

| Example | Additive | Additive Amount (g) | Ti (ppm) | P (ppm) | IV (dl/g) | AA FN (ppm) | AAGEN 295/5 (ppm) | AVG L* Color | AVG a* Color | AVG b* Color |
|---|---|---|---|---|---|---|---|---|---|---|
| 24 | Cyasorb UV 3529-H3PO4 | 0.105 | 10 | 83 | 0.725 | 3.6 | 7.19 | 76.03 | −2.65 | 8.71 |
| 25 | Cyasorb UV 3529 H3PO4 | 0.106 | 10 | 99 | 0.732 | 3.34 | 7.69 | 76.02 | −2.51 | 8.66 |

Table 6 indicates that even at the very low concentration of 0.02 weight percent, the phosphorous acid salts of Cyasorb UV 3529 provides for a dramatic lowering (>70% reduction relative to no additive) of both residual acetaldehyde as well as acetaldehyde generated upon melting.

Example D

To make the phosphoric acid salts of CyasorbUV 3529, two moles of phosphoric acid are used per mole of CyasorbUV 3529, and reacted according to the following procedure.

To a 500-mL, round-bottomed flask equipped with a magnetic stir bar, thermocouple, and a heating mantle is added 41.18 g of Cyasorb UV-3529 and 94.51 g of toluene. Cyasorb UV-3529 is a polymeric hindered amine light stabilizer believed to conform generally to the compounds of amine formula (12) set forth above $R_6=R_7=R_8=R_9=R_{10}$=methyl; $L_1$ is hexamethylene; and $(R_3)(R_4)N$— collectively represent a morpholino group. The slurry is heated to 60° C. and stirred until a homogeneous solution was obtained. A solution of 16.23 g (0.141 mol) of phosphoric acid dissolved into 37.01 g of isopropyl alcohol is added in a small steady stream (moderate dropwise) via an addition funnel to the Cyasorb UV-3529 solution with rapid stirring over approximately 100 minutes. If the addition is too rapid, big chunks of solids form and make it difficult to stir. A slurry with light-colored solids is obtained and is stirred for 15 min once the addition is complete. The precipitate is a mixture of a fine white powder and sticky amber globules coated with white powder and is collected by suction filtration. The filter cake is washed with seven 40 mL portions of heptane and then sucked dry on the filter paper for 2 h. The solid is placed in a metal pan and dried over the weekend at 50° C. with a slight ingress of dry nitrogen. The dry product weighs approximately 36.48 g (66% of theory; fines in filtrate were not isolated).

A further series of polymers were prepared, employing the phosphoric acid salt of CYASORB UV 3529 ("Cyasorb UV 3529-H3PO4"). These examples use the melt-blending procedure outlined in Table 3 and the polymer described in Example B. For Example 23, the phosphorous acid salt of CYASORB UV 3529 is one described in Example A. Table 7 indicates that the levels of residual AA and AA generated upon melting were very similar for both the phosphoric acid salts of Cyasorb UV 3529 and the phosphorous acid salts of Cyasorb UV 3529. The average AAGen of production control PET pellets tested at the same time was 22.6 ppm. The runs with the phosphoric acid salt turned out to have a somewhat higher P level. The b* color, or yellowness, of the blends with the phosphoric acid salts may be slightly higher.

Example E

Further inventive additives were also employed: the phosphorous acid salt of N-methylpiperidine ("NMP-$H_3PO_3$"), the phosphorous acid salt of ammonia ("Ammonia—$H_3PO_3$"), and the phosphoric acid salt of N-methylpiperidine ("NMP—$H_3PO_4$").

To make the phosphorous acid salts of N-methylpiperidine, one mole of phosphorous acid are used per mole of N-methylpiperidine, and reacted according to the following procedure.

To a 500-mL, round-bottomed flask equipped with a magnetic stir bar, thermocouple, and a heating mantle is added 7.0 g of 1-methyl-piperidine (0.0704 mol) and 94.5 g of toluene. The slurry is heated to 60° C. and stirred until a homogeneous solution was obtained. A solution of 5.8 g (0.0704 mol) of phosphorous acid dissolved into 37 g of isopropyl alcohol is added in a small steady stream (fast dropwise) via an addition funnel to the 1-methyl-piperidine solution with rapid stirring over approximately 55 minutes. The reaction mixture was pumped at about 5 mL/min over a period of approximately 40 minutes into a 2 L reaction vessel, fitted with a mechanical stirrer, that contained about 700 mL of rapidly stirred heptane (476.8 g). After addition was complete, the resulting solution was stirred for about 50 minutes. Suction filtration was initiated and then stopped when the product was determined to be a yellow oil containing some fine white solids. The solvent was rotavapped off using a vacuum pump and 55° C. water bath. The filter paper and flask were rinsed with heptane. The solvent was removed on a rotary evaporator. The oil was dried over night and then for about 5 hours at about 50° C. with a slight ingress of dry nitrogen. The product weighed 7.5 g (12.75 g theory).

To make the phosphorous acid salts of ammonia, one mole of phosphorous acid are used per mole of ammonia, and reacted according to the following procedure.

To a 500-mL, round-bottomed flask equipped with a magnetic stir bar, thermocouple, and a heating mantle is added 8.5 g of 28-30% ammonium hydroxide and 94.5 g of toluene. The slurry is heated to 60° C. and stirred until a homogeneous solution was obtained. A solution of 5.8 g (0.0704 mol) of phosphorous acid dissolved into 37.1 g of isopropyl alcohol is added in a small steady stream (fast dropwise) via an addition funnel to the ammonium hydroxide solution with rapid stirring over approximately 25 minutes. The solution is stirred for 15 min once the addition is complete. The reaction mixture was pumped at about 5 mL/min over a period of approximately 35 minutes into a 2 L reaction vessel, fitted with a mechanical stirrer that contained about 700 mL of rapidly stirred heptane (476.8 g). After addition was complete, the resulting solution was stirred for about 60 minutes. The solvent was rotavapped off using a vacuum pump and 55° C. water bath. White semisolids were visible after all the solvent was removed. The flask was rinsed with heptane, isopropyl alcohol & Millipore water. The solvents were removed on a rotary evaporator. The white solid is dried over night at 50° C. with a slight ingress of dry nitrogen. The product weighed 7.3 g.

To make the phosphoric acid salts of N-methylpiperidine, one mole of phosphoric acid are used per mole of N-methylpiperidine, and reacted according to the following procedure.

To a 500-mL, round-bottomed flask equipped with a magnetic stir bar, thermocouple, and a heating mantle is added 7.0 g of 1-methyl-piperidine and 94.5 g of toluene. The slurry is heated to 60° C. and stirred until a homogeneous solution was obtained. A solution of 8.1 g (0.0704 mol) of 85% phosphoric acid dissolved into 37 g of isopropyl alcohol is added in a small steady stream (fast dropwise) via an addition funnel to the 1-methyl-piperidine solution with rapid stirring over approximately 50 minutes. A yellow liquid with a white ring of solids is obtained and is stirred for 15 min once the addition is complete. After scraping sticky solids out of flask, the precipitate was collected by suction filtration. The filter cake is washed with eight approximately 40 mL portions of heptane and then sucked dry on the filter paper for 3 h. The solid is placed in a metal pan and dried over night and most of the next day at 50° C. with a slight ingress of dry nitrogen. The product weighed 12.1 g.

Per Table 8, the salts of the smaller, simpler bases had about half the reduction in AA generation of the UV 3529-H3PO3; however, the simpler salts are much less expensive.

In addition to the further inventive additives, a run was also made to investigate the use of an amine additive itself, and not its salt. The results are presented in Table 8 below. The average AAGen of production control PET pellets tested at the same time was 22.0 ppm. Cyasorb UV 3529 did not reduce residual AA much; however, there was around a slight reduction in AA generation (10-15%). The amines alone are much less effective at lowering acetaldehyde than the amine salts made with a phosphorus-containing acid. Of the salts shown in Table 8, the ones with the smaller, simpler organic bases had about half of the reduction in AA generation than that of the Cyasorb UV 3529-H3PO3 salt.

To make the phosphoric acid salts of L-histidine, two moles of phosphoric acid are used per mole of L-histidine, and reacted according to the following procedure.

To a 500-mL, round-bottomed flask equipped with a magnetic stir bar, thermocouple, and a heating mantle is added 10.94 g of L-histidine and 143.97 g of Millipore water. The slurry is heated to 60° C. and stirred until a homogeneous solution was obtained. A solution of 16.397 g of phosphoric acid dissolved into 37 g of Millipore water is added in a small steady stream (fast dropwise) via an addition funnel to the L-histidine solution with rapid stirring over approximately 35 minutes. The solution is stirred for about 35 min once the addition is complete. The clear solution was transferred to a single-necked, 500 mL round-bottomed flask. The aqueous solvent was removed by freeze drying. The liquid was frozen while manually rotating in a dry ice/acetone bath. A lyophilizer was used for 3 days, 4 hours and 17 min. The white solid weighed 24.829 g (theory 24.722 g). By XRF, wt./wt. % P in the white solid was 1.17% (theory 17.6%).

To make the phosphoric acid salts of L-alanine, one mole of phosphoric acid are used per mole of L-alanine, and reacted according to the following procedure.

To a 500-mL, round-bottomed flask equipped with a magnetic stir bar, thermocouple, and a heating mantle is added 6.275 g of L-alanine and 94.5 g of Millipore water. The slurry is heated to 60° C. and stirred until a homogeneous solution was obtained. A solution of 8.201 g of phosphoric acid dissolved into 37.01 g of Millipore water is added in a small steady stream (fast dropwise) via an addition funnel to the L-alanine solution with rapid stirring over approximately 17 minutes. The solution is stirred for at least 15 min once the addition is complete. The clear solution was transferred to a single-necked, 500 mL round-bottomed flask. The aqueous solvent was removed by freeze drying. The liquid was frozen while manually rotating in a dry ice/acetone bath. A lyophilizer was used for 1 days, 19 hours and 15 min. The clear, viscous oil weighed 14.808 g (theory 13.17 g). By XRF, wt./wt. % P in the clear oil was 11.92% (theory 16.6%).

TABLE 8

| Ex. | Additive | Amount added to flask (g) | XRF Ti (ppm) | XRF P (ppm) | IhV (dL/g) | Residual AA (ppm) | % Residual AA Reduction | AA GEN 295/5 (ppm) | % AA Gen Reduction | Ave. L* Color | Ave. a* Color | Ave. b* Color |
|---|---|---|---|---|---|---|---|---|---|---|---|---|
| C18 | None | 0 | 9 | 3 | 0.804 | 21.25 | −9.8 | 30.54 | −2.2 | 74.37 | −1.93 | 7.33 |
| C19 | None | 0 | 10 | 5 | 0.79 | 17.45 | 9.8 | 29.25 | 2.2 | 76.12 | −2.22 | 8.03 |
| C20 | Cyasorb 3529 | 0.099 | 10 | 1 | 0.817 | 17.43 | 9.9 | 25.71 | 14 | 74.78 | 1.88 | 8.43 |
| 26 | Cyasorb UV 3529-H3PO3 | 0.101 | 10 | 57 | 0.747 | 4.57 | 76.4 | 11.96 | 60 | 76.73 | −2.73 | 7.82 |
| 27 | Cyasorb UV 3529-H3PO3 | 0.103 | 10 | 59 | 0.757 | 3.53 | 81.8 | 12.4 | 58.5 | 73.77 | −2.65 | 7.32 |
| 28 | NMP-H3PO3 | 0.048 | 10 | 66 | 0.768 | 7.18 | 62.9 | 20.73 | 30.7 | 76.2 | −2.72 | 7.63 |
| 29 | NMP-H3PO3 | 0.052 | 9 | 85 | 0.754 | 13.87 | 28.3 | 18.88 | 36.8 | 75.01 | −2.64 | 7.52 |
| 30 | NMP-H3PO4 | 0.053 | 10 | 78 | 0.746 | 13.94 | 28 | 20.35 | 31.9 | 69.76 | −2.35 | 8.7 |
| 31 | Ammonia-H3PO3 | 0.028 | 10 | 63 | 0.754 | 6.78 | 65 | 19.33 | 35.3 | 73.81 | −2.58 | 8.73 |

While the amine portion of the salt may scavenge some AA as shown in Example C20 in Table 8, without being bound to a theory, it is thought that the predominant mechanism is thought to be catalyst deactivation.

Example F

Choosing an amino acid as the organic base offers the possibility that the carboxylic acid group of the amino acid may react into the PET chain.

A further series of polymers were prepared, employing the phosphoric acid salt of L-histidine, phosphoric acid salt of L-alanine, both described above in this example, and the phosphoric acid salt of CYASORB UV 3529 ("Cyasorb UV 3529-H3PO4") described in Example D. These examples use the melt-blending procedure outlined in Table 3 and the polymer described in Example B.

Table 9 indicates the two amino acid salts of phosphoric acid reduce residual AA by 79-83% and AA generation upon melting by 65-66%. The CYASORB UV 3529 salt of phosphoric acid reduces residual AA by about 87%, AA generation upon melting by about 75%, and has the best color. While the % reduction in AA generation is about 10% less for the amino acid salts than for the Cyasorb UV 3529 salt, the amino acids are less expensive, copolymerizable (less extractability), and water soluble (no VOC during salt preparation). The color and clarity are better for Example 34 with the L-alanine salt than for Example 33 with the L-histidine salt. L-alanine is also more water soluble than L-histidine, which requires more dilute conditions to get it into aqueous solution. The phosphoric acid salt of L-alanine is an oil, which may make it more economical to add than a solid salt like the phosphoric acid salt of L-histidine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

cutter, and the addition of said additive takes place at a location near or at the end of a final reactor.

7. The process of claim 1, wherein said polyethyleneterephthalate polyester contains not more than 10 mole percent of diol residues of diols other than ethylene glycol, and no more than 10 mole percent of diacid residues other than residues of terephthalic acid, where the mole % of other diol residues are based on 100 mole % of total glycol residues in the polyester and where the mole % of other diacid residues are based on 100 mole % of total diacid residues in the polyester.

8. The process of claim 1, wherein said polyester is a polyethyleneterephthalate polyester, said titanium catalyst is present in an amount of from 3 ppm to 35 ppm calculated as titanium relative to the weight of the polyester, and the addition of said additive causes a reduction of at least 20% in the content of acetaldehyde in the polyester relative to the amount

TABLE 9

| Ex. | Additive | Amount added to flask (g) | XRF Ti (ppm) | XRF P (ppm) | IhV (dL/g) | Residual AA (ppm) | % Residual AA Reduction | AA GEN 295/5 (ppm) | % AA Gen Reduction | Ave. L* Color | Ave a* Color | Ave. b* Color |
|---|---|---|---|---|---|---|---|---|---|---|---|---|
| C21 | None | 0 | 9 | 2 | 0.781 | 11.5 | 0 | 28.7 | 0 | 75.9 | −2.1 | 8.2 |
| 32 | Cyasorb UV 3529-H3PO4 | **** | 9 | 90 | 0.745 | 1.5 | 86.8 | 7.2 | 74.8 | 76.5 | −2.3 | 8.0 |
| 33 | Histidine-H3PO4 | **** | 10 | 63 | 0.756 | 1.9 | 83.2 | 10.0 | 65.1 | 74.0 | −2.0 | 10.7 |
| 34 | Alanine-H3PO4 | **** | 10 | 64 | 0.736 | 2.5 | 78.7 | 9.7 | 66.1 | 75.1 | −2.0 | 9.0 |

What is claimed is:

1. A process for reducing the acetaldehyde content of polyesters susceptible to generation of acetaldehyde during their preparation or subsequent use, comprising preparing said polyester by a continuous melt polymerization process comprising polycondensing a polyester melt in the presence of one or more titanium polycondensation catalysts, and after the It.V. of the melt reaches at least 0.45 dL/g, adding to said polyester melt in said continuous melt polymerization process at least one additive comprising an ammonium salt of an oxyphosphorus acid compound containing an oxyphosphorus group, an amine salt of an acid compound containing an oxyphosphorus group, or mixture thereof, wherein said polyester has a final It.V. after solidification from the melt, and prior to optional solid state polymerization, of from 0.7 to 1.2 dL/g, and wherein said polyester comprises a polyethyleneterephthalate polyester.

2. The process of claim 1, wherein addition of said additive takes place following the polyester reaching an It.V. of at least 0.60dL/g during melt polymerization.

3. The process of claim 1, wherein addition of said additive takes place following the polyester reaching an It.V. of at least 0.68 dL/g during melt polymerization.

4. The process of claim 1, wherein addition of said additive takes place following the polyester reaching an It.V. of at least 0.72 dL/g during melt polymerization.

5. The process of claim 1, wherein addition of said additive takes place following the polyester reaching an It.V. of at least 0.76 dL/g during melt polymerization.

6. The process of claim 1, wherein the polyester melt is polycondensed in more than one reactor and is cut with a of acetaldehyde in an otherwise identical polyester prepared in an identical fashion but without addition of the additive.

9. The process of claim 8 wherein the titanium catalyst comprises a titanium alkoxide.

10. The process of claim 8 wherein the titanium catalyst is present in an amount of from 3 ppm to 20 ppm calculated as titanium relative to the weight of the polyester.

11. The process of claim 1, wherein an amine salt is employed, said amine salt being a salt of one or more acid compounds containing an oxyphosphorus group selected from the group consisting of hypophosphorous acid, phosphorous acid, phosphoric acid, and polyphosphoric acid.

12. The process of claim 1, wherein said salt is a phosphorous acid salt, a phosphoric acid salt, or mixture thereof.

13. The process of claim 1, wherein the amount of said ammonium salt or amine salt of an acid phosphorus-containing compound added to said polyester is an amount sufficient to supply from 3 ppm to 250 ppm phosphorus based on the weight of the polyester.

14. The process of claim 13, wherein the amount of said ammonium salt or amine salt of an acid phosphorus-containing compound added to said polyester is an amount sufficient to supply from 7 ppm to 150 ppm phosphorus based on the weight of the polyester.

15. The process of claim 1, wherein said amine is a cyclic amine or hindered amine.

16. The process of claim 15, wherein said hindered amine is selected from the group consisting of:

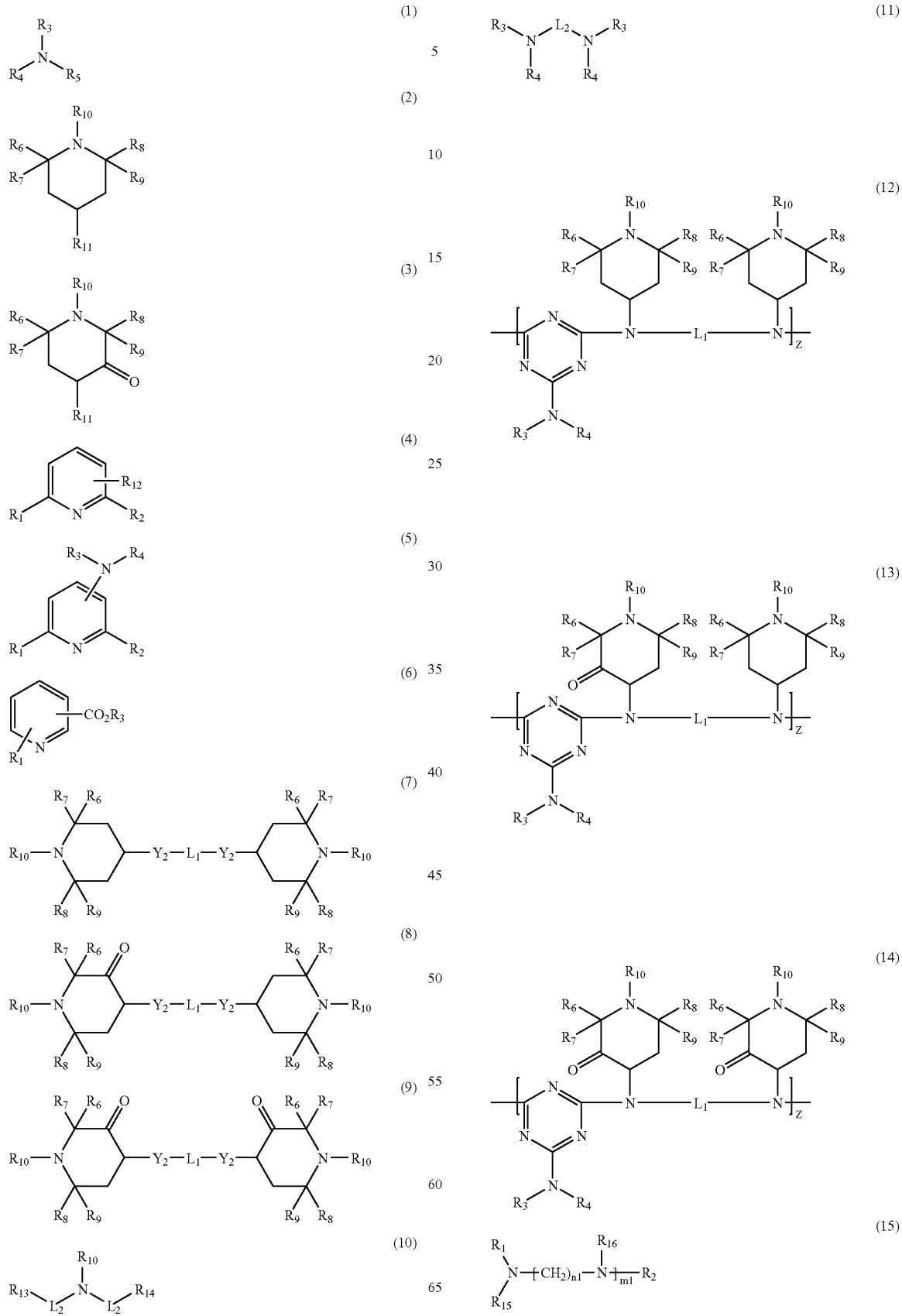

-continued

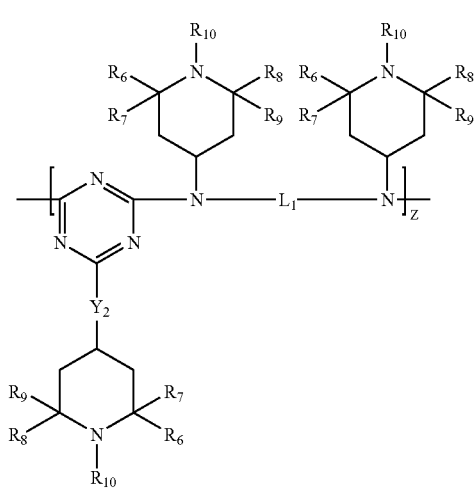
(16)

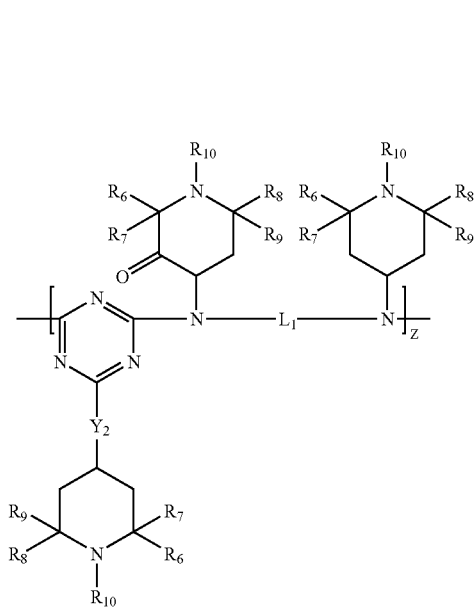
(17)

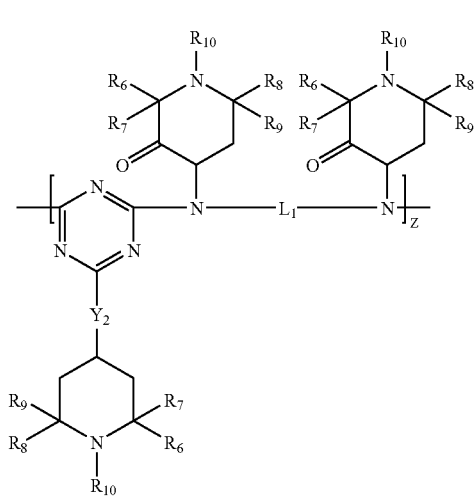
(18)

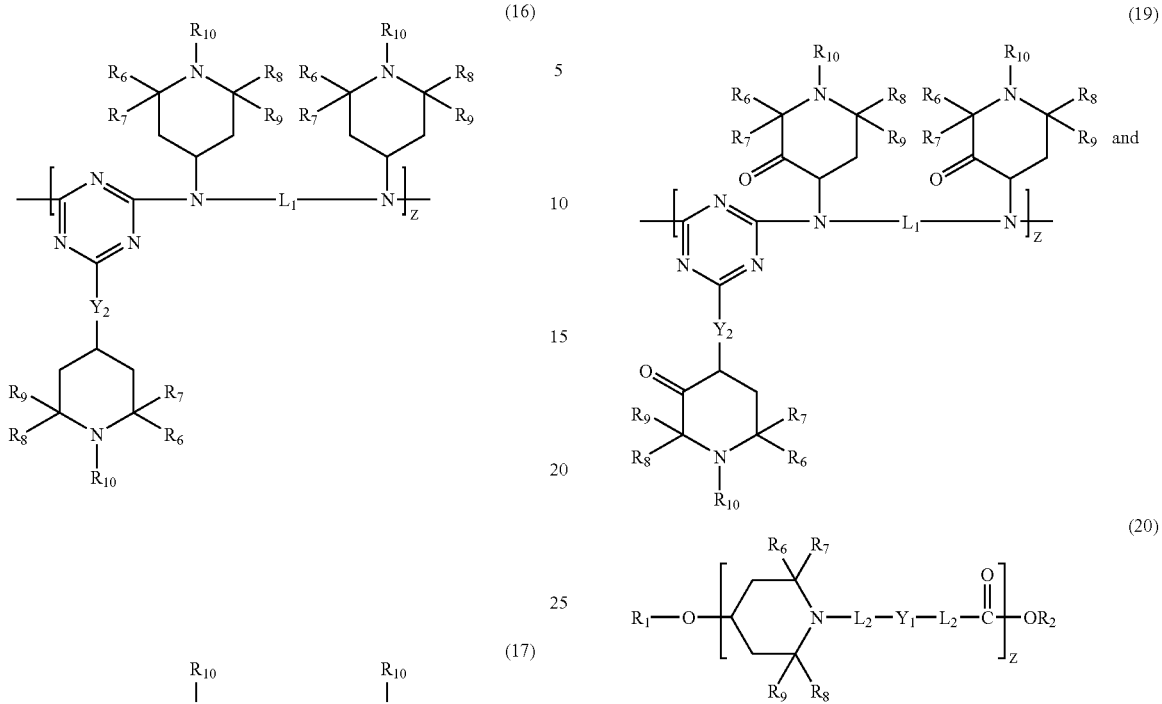
(19)

(20)
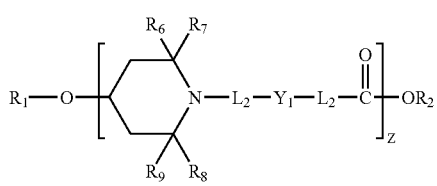

wherein
  $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
  $R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;
  $R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;
  $R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
  $R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$-$R_3$ or a succinimido group having the formula

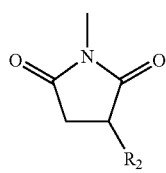

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring;

the —N(R$_3$)(R$_4$) group may be located at the 2, 3 or 4 positions on the pyridine ring of nitrogen compound (5);

the —CO$_2$R$_3$ and R$_1$ groups may be located at any of the 2, 3, 4, 5, 6 positions of the pyridine ring of nitrogen compound (6);

L$_1$ is a divalent linking group selected from C$_2$-C$_{22}$-alkylene; —(CH$_2$CH$_2$—Y$_1$)$_{1-3}$—CH$_2$CH$_2$—; C$_3$-C$_8$-cycloalkylene; arylene; or —CO—L$_2$—OC—;

L$_2$ is selected from C$_1$-C$_{22}$-alkylene, arylene, —(CH$_2$CH$_2$—Y$_1$)$_{1-3}$—CH$_2$CH$_2$—and C$_3$—C$_8$-cycloalkylene;

Y$_1$ is selected from —OC(O)—, —NHC(O)—, —O—, —S—, —N(R$_1$)—;

Y$_2$ is selected from —O—or —N(R$_1$)—;

R$_{13}$ and R$_{14}$ are independently selected from —O—R$_2$, and —N(R$_2$)$_2$;

Z is a positive integer of up to about 20;

m1, is selected from 0 to about 10;

n1 is a positive integer selected from 2 to about 12;

R$_{15}$, and R$_{16}$ are independently selected from hydrogen, C$_1$-C$_{22}$-alkyl, substituted C$_1$-C$_{22}$-alkyl, C$_{3-8}$-cycloalkyl, substituted C$_3$-C$_8$-cycloalkyl, heteroaryl, aryl, and radical A wherein radical A is selected from the following structures:

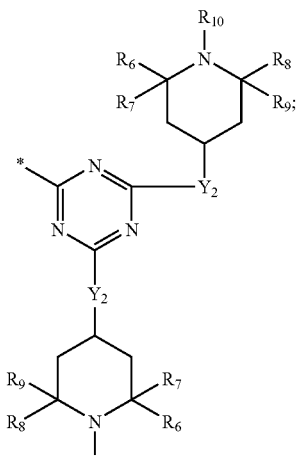

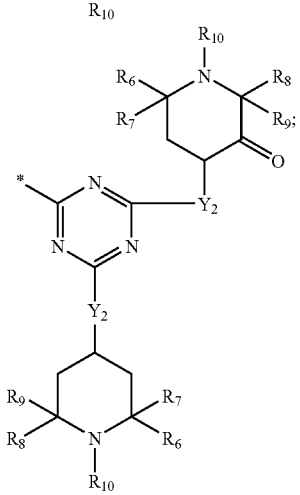

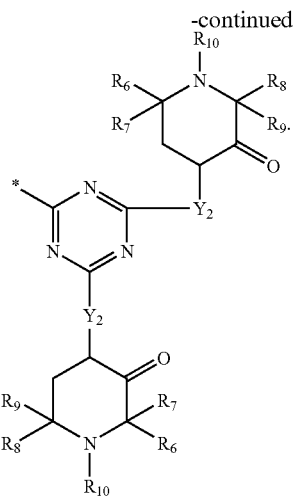

17. The process of claim 15, wherein said amine salt is a phosphorous acid salt of a hindered amine comprising units of the formula

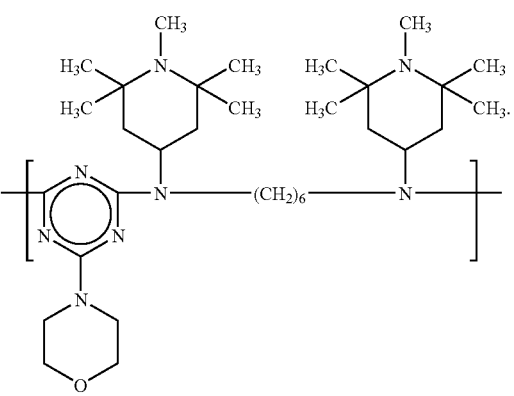

(21)

18. The process of claim 15, wherein said amine salt is a phosphoric acid salt of a hindered amine comprising units of the formula

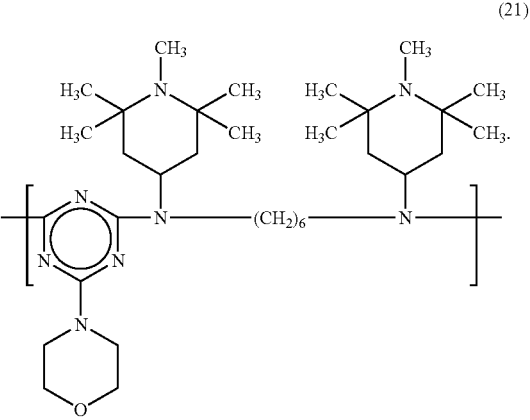

(21)

19. The process of claim 15, wherein said amine salt is a salt of N- methylpiperidine with at least one of phosphorous acid or phosphoric acid.

20. The process of claim 1, wherein said amine salt is a salt of an amino acid with at least one of phosphorous acid or phosphoric acid.

21. The process of claim 1, wherein said amine salt is a salt of alanine with at least one of phosphorous acid or phosphoric acid.

22. The process of claim 1, wherein said amine salt is added in an amount sufficient to supply from 20 ppm to 100 ppm phosphorus based on the weight of the polyester.

23. the process of claim 1, the process comprising:
 a) selecting as a polymerizable diol component ethylene glycol and not more than 20 mole percent of diol residues other than ethylene glycol based on 100 mole % of total moles of diol residues in the polyester;
 b) selecting as a polymerizable diacid component terephthalic acid and not more than 20 mole percent of diacid residues other than terephthalic acid based on 100 mole % of total moles of diacid residues in the polyester;
 c) esterifying and polyesterifying said diol component and said diacid component to a weight-average molecular weight of at least 1000 grams per mole,
 d) polycondensing, in one or a plurality of stages, the product of step c) to a polyester of said target ItV in the presence of at least one titanium catalyst in an amount of from 3 ppm to 35 ppm titanium based on the total weight of polyester; and
 e) adding said additive to step d) when the ItV of the polyester is at least 0.50 dL/g, in an amount ranging from 5 ppm to 250 ppm phosphorus based on the weight of the polyester; and
 f) following steps d) and e), solidifying molten polyester to a solid polyester product.

24. The process of claim 23, wherein said additive is added during step d) at a point where the polyester ItV is at least 0.68 dL/g.

25. The process of claim 1, wherein the polyester melt is polycondensed in more than one reactor and is cut with a cutter, and the addition of said additive takes place at a location near the end of a final reactor.

26. The process of claim 1, wherein the additive is added when at least 95% of the polycondensation time has elapsed.

27. The process of claim 23, wherein said amine salt is added to a finisher in an amount sufficient to supply from 20 ppm to 100 ppm phosphorus.

28. The process of claim 23, wherein said additive is added at a point when the It. V. of the polyester polymer is at least 0.72 dL/g.

29. The process of claim 23, wherein at least one titanium catalyst is added in an amount of from 5 ppm to 20 ppm titanium based on the total weight of polyester.

30. The process of claim 23, wherein said hindered amine is selected from the group consisting of:

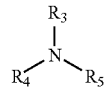

(1)

-continued

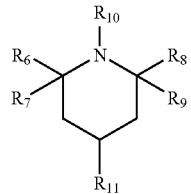

(2)

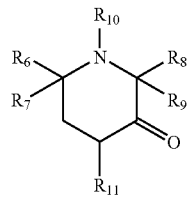

(3)

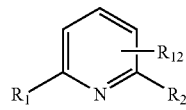

(4)

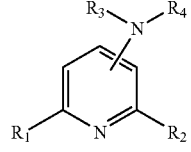

(5)

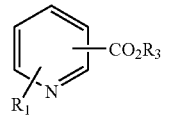

(6)

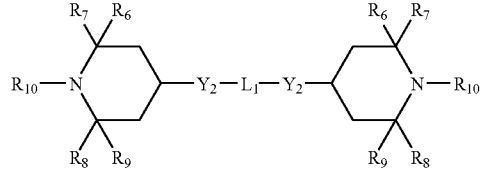

(7)

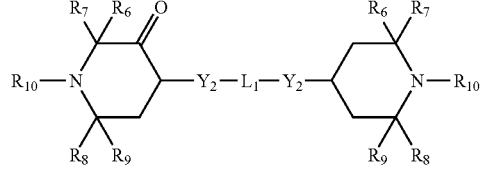

(8)

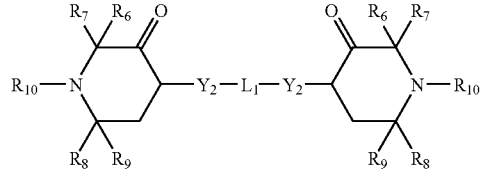

(9)

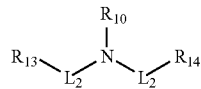

(10)

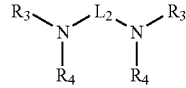

(11)

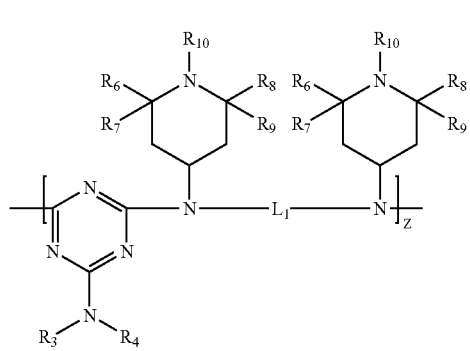
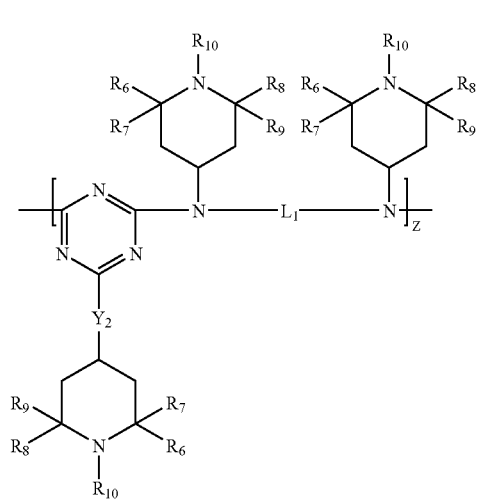
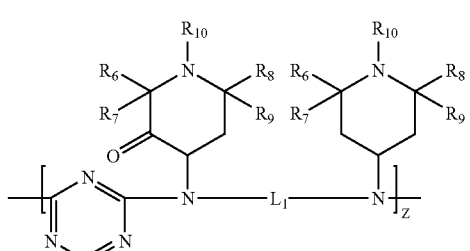
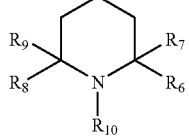
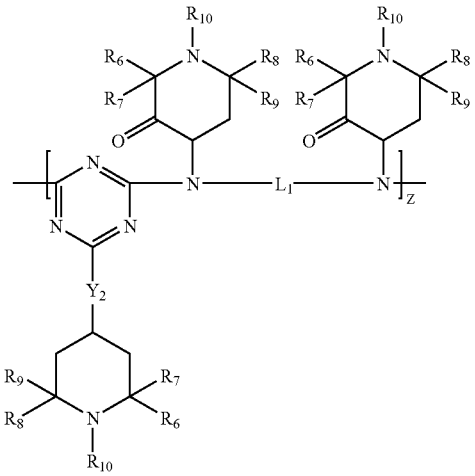
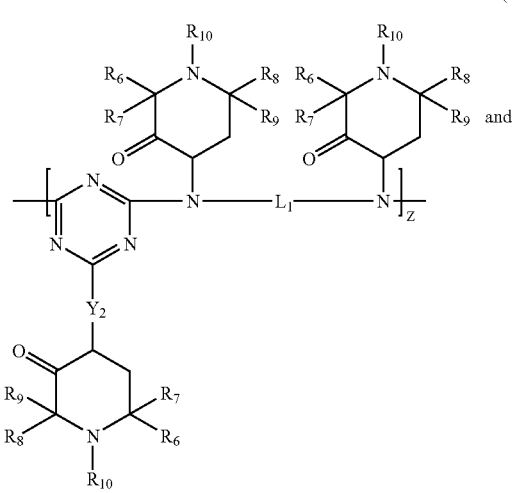

-continued

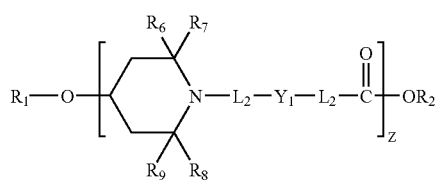
(20)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3C_8$-cycloalkyl wherein, at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$-$R_3$ or a succinimido group having the formula

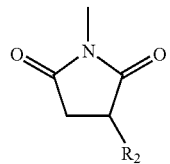

$R_{12}$ is selected from hydrogen, $C_1$-$C_{22}$-alkyl, substituted $C_1$-$C_{22}$-alkyl, $C_3$-8-cycloalkyl, substituted $C_3$-$C_8$-cycloalkyl, heteroaryl, aryl and may be located at the 3, 4 or 5 positions on the aromatic ring;

the —$N(R_3)(R_4)$ group may be located at the 3, 4 or 5 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —CO—$L_2$—OC—;

$L_2$ is selected from $C_1$-$C_{22}$-alkylene, arylene, —$(CH_2CH_2$—$Y_1)_{1-3}$—$CH_2CH_2$—and $C_3$-$C_8$-cycloalkylene;

$Y_1$ is selected from —OC(O)—, —NHC(O)—, —O—, —S—, —$N(R_1)$—;

$Y_2$ is selected from —O— or —$N(R_1)$—;

$R_{13}$ and $R_{14}$ are independently selected from —O—$R_2$, and —$N(R_2)_2$;

Z is a positive integer of up to about 20;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

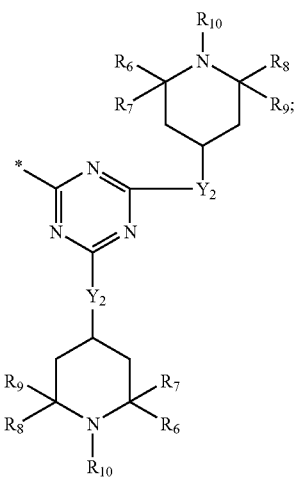

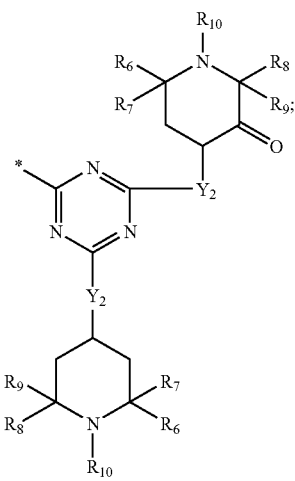

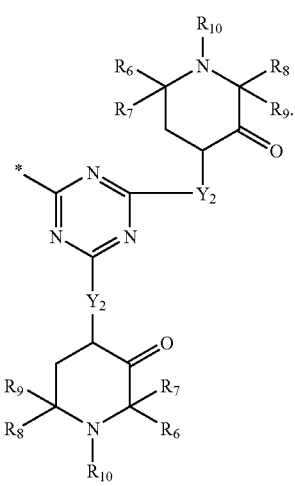

31. The process of claim 23, wherein said acetaldehyde-reducing compound is an amine salt of one or more of phosphorous acid and phosphoric acid, and said amine is

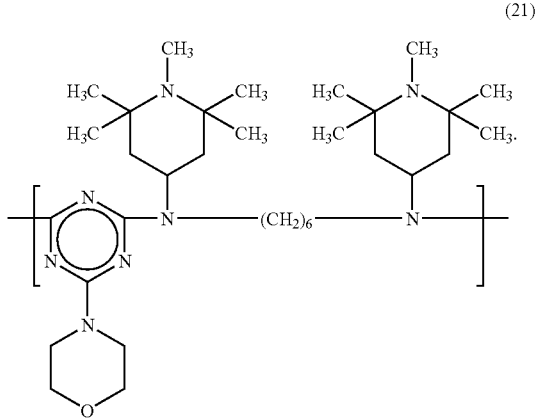

(21)

32. The process of claim 23, wherein said amine salt is a salt of an optionally substituted piperidine with one or more of phosphorous acid or phosphoric acid.

33. The process of claim 23, wherein said amine salt is a salt of an amino acid with one or more of phosphorous acid or phosphoric acid.

34. The process of claim 23, wherein said amine salt is a salt of ammonia or its derivative with one or more of phosphorous acid or phosphoric acid.

35. The process of claim 23, further comprising subjecting the solid polyester product to solid state polymerization for a time sufficient to obtain a polymer It.V.higher than said final It.V. of the polymer exiting the melt phase process.

36. The process of claim 1, wherein the salt is added when at least 75% of the polycondensation time has elapsed.

37. The process of claim 1, wherein the salt is added when at least 90% of the polycondensation time has elapsed.

38. The process of claim 1, wherein the salt is added when at least the polyester melt in the melt phase process at a point within 0.05 dL/g of the final It.V. exiting the melt phase process.

39. The process of claim 38, wherein the point is within 0.03 dL/g.

40. The process of claim 38, wherein the point is within 0.015 dL/g.

41. The process of claim 1, wherein the salt is added at a point within 10 minutes of less of solidifying the melt.

* * * * *

UNITED STATES PATENT AND TRADEMARK OFFICE
CERTIFICATE OF CORRECTION

PATENT NO. : 7,655,746 B2
APPLICATION NO. : 11/229367
DATED : February 2, 2010
INVENTOR(S) : Jernigan It is certified that error appears in the above-identified patent and that said Letters Patent is hereby corrected as shown below:

Columns 42 and 49, Lines 26 and 6, Claims 16 and 30 in Formula 20 that portion that shows "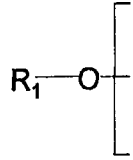"

should show 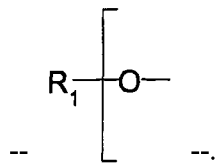

Column 49, Line 12 "$C_{1-22}$-alkyl" should read --$C_1$-$C_{22}$- alkyl--.

Signed and Sealed this

Seventh Day of December, 2010

David J. Kappos
*Director of the United States Patent and Trademark Office*